(12) United States Patent
Kreysler et al.

(10) Patent No.: US 9,365,017 B2
(45) Date of Patent: Jun. 14, 2016

(54) MOLDABLE FIRE RESISTANT COMPOSITES

(71) Applicant: William Kreysler & Associates, Inc., American Canyon, CA (US)

(72) Inventors: William Kreysler, San Rafael, CA (US); Serge Labesque, Glenn Ellen, CA (US)

(73) Assignee: WILLIAM KREYSLER & ASSOCIATES, INC., American Canyon, CA (US)

( * ) Notice: Subject to any disclaimer, the term of this patent is extended or adjusted under 35 U.S.C. 154(b) by 51 days.

(21) Appl. No.: 14/037,325

(22) Filed: Sep. 25, 2013

(65) Prior Publication Data

US 2015/0086793 A1 Mar. 26, 2015

(51) Int. Cl.
| | |
|---|---|
| *B32B 27/06* | (2006.01) |
| *B32B 27/20* | (2006.01) |
| *B32B 27/36* | (2006.01) |
| *B32B 33/00* | (2006.01) |
| *B32B 27/08* | (2006.01) |
| *B32B 38/10* | (2006.01) |
| *B32B 38/00* | (2006.01) |

(52) U.S. Cl.
CPC .............. *B32B 27/36* (2013.01); *B32B 27/08* (2013.01); *B32B 27/20* (2013.01); *B32B 33/00* (2013.01); *B32B 38/10* (2013.01); *B32B 2038/0076* (2013.01); *B32B 2255/10* (2013.01); *B32B 2255/26* (2013.01); *B32B 2262/101* (2013.01); *B32B 2264/10* (2013.01); *B32B 2305/08* (2013.01); *B32B 2305/30* (2013.01); *B32B 2307/3065* (2013.01); *B32B 2607/00* (2013.01); *Y10T 428/31786* (2015.04)

(58) Field of Classification Search
USPC ........ 428/688, 689, 699, 295.1, 297.1, 297.4, 428/300.7, 323, 325, 354, 356, 402, 213, 428/212, 428, 332, 426
See application file for complete search history.

(56) References Cited

U.S. PATENT DOCUMENTS

| | | | | |
|---|---|---|---|---|
| 3,934,066 | A * | 1/1976 | Murch | 442/221 |
| 4,156,533 | A * | 5/1979 | Close et al. | 277/652 |
| 4,395,453 | A * | 7/1983 | Lines et al. | 428/216 |
| 4,632,865 | A * | 12/1986 | Tzur | 428/304.4 |
| 5,603,990 | A * | 2/1997 | McGinniss et al. | 427/393.3 |
| 5,989,706 | A * | 11/1999 | McGinniss et al. | 428/341 |
| 6,410,137 | B1 * | 6/2002 | Bunyan | 428/356 |
| 6,716,485 | B2 * | 4/2004 | Wong et al. | 427/402 |
| 6,984,670 | B2 | 1/2006 | Meyers, III et al. | |
| 7,018,699 | B2 * | 3/2006 | Dykhoff | 428/76 |
| 8,347,794 | B2 | 1/2013 | Muirhead | |
| 8,397,465 | B2 | 3/2013 | Hansbro et al. | |
| 8,444,790 | B2 * | 5/2013 | Tong | 156/71 |
| 2002/0098357 | A1 * | 7/2002 | Keogh | 428/375 |
| 2005/0232827 | A1 * | 10/2005 | Merry | 422/179 |
| 2008/0188590 | A1 * | 8/2008 | Gupta | 523/179 |
| 2010/0086268 | A1 * | 4/2010 | Reyes | 385/100 |

(Continued)

OTHER PUBLICATIONS

"PCT International Search Report and Written Opinion", PCT/US2014/056649, mailed Dec. 29, 2014.

*Primary Examiner* — Lauren R Colgan
(74) *Attorney, Agent, or Firm* — Polsinelli PC

(57) ABSTRACT

Moldable fire resistant composites and processes for making moldable fire resistant composites are herein disclosed. According to one embodiment, a moldable fire resistant composite includes a first composite layer comprising an intumescent resin and a heat-dissipating component adhered to a second composite layer comprising a halogenated resin and a reinforcing structure.

20 Claims, 32 Drawing Sheets

(56) References Cited

U.S. PATENT DOCUMENTS

2010/0251941 A1* 10/2010 Muirhead ................ 108/57.27
2011/0237711 A1* 9/2011 Herman et al. ............ 523/445
2011/0287237 A1* 11/2011 Riebel et al. ............. 428/195.1
2012/0015176 A1* 1/2012 Riebel et al. .............. 428/323
2012/0291377 A1* 11/2012 Riebel et al. ................ 52/232
2013/0280535 A1* 10/2013 Maas et al. ................ 428/412

* cited by examiner

Exterior Wall Temperature (°F)

MOLDABLE FIRE RESISTANT COMPOSITES

FIELD OF TECHNOLOGY

This specification is directed to moldable fire resistant composites and processes for manufacturing moldable fire resistant composites.

BACKGROUND

Various fire retardant compositions are known in the art. Fire retardant compositions are critical in the construction of buildings and other structures where they are used to protect the integrity of the structure, safety systems, power systems and communication systems during a fire.

Many countries require building materials to pass fire safety standards and codes before use in buildings. The International Code Council (ICC) is a building safety and construction association that develops codes and standards used in the design and compliance process for constructing buildings in the United States. In 2012, the ICC upheld the National Fire Protection Association 285 (NFPA 285) test for exterior walls with combustible weather barriers. The ASTM E84-13a (E84-13) is another standard method for testing the surface burning characteristics of exposed surfaces, such as walls and ceilings in buildings. In the United States and elsewhere, building materials must comply with the NFPA 285, E84-13 and similar standards.

Precast concrete, glass fiber reinforced concrete (GFRC) and metal are often used in exterior building panels. Precast concrete, GFRC and metal panels can be designed to pass the NFPA 285 and E84-13 tests. However, concrete panels drastically increase the weight of the structure and the required magnitude of structural support. Metal panels are susceptible to corrosion, are not easily molded to accommodate specific architectural designs and present other design limitations. There is a need in the art to reduce the weight of exterior building panels and the structural load without compromising the fire resistant and smoke suppressant properties of materials used in the construction of structures and buildings.

This specification is directed to improved moldable fire resistant composites and processes for making moldable fire resistant composites.

SUMMARY

Fire resistant composites and processes for making fire resistant composites are herein disclosed. Those of ordinary skill in the art will recognize that intumescent substances, which swell during exposure to heat, thereby increasing the volume and decreasing the density, can provide effective passive fire suppressant qualities.

According to one embodiment, a moldable fire resistant composite includes a first composite layer comprising an intumescent resin and a heat-dissipating component adhered to a second composite layer comprising a halogenated resin and a reinforcing structure. The first composite layer can be adhered to the second composite layer with an adhesive layer comprising an intumescent resin or other fire or smoke retardant adhesive.

The foregoing and other objects, features and advantages of the present disclosure will become more readily apparent from the following detailed description of exemplary embodiments as disclosed in this specification.

BRIEF DESCRIPTION OF THE DRAWINGS

Embodiments of the present application are described, by way of example only, with reference to the attached Figures, wherein.

DETAILED DESCRIPTION

Figure 1:
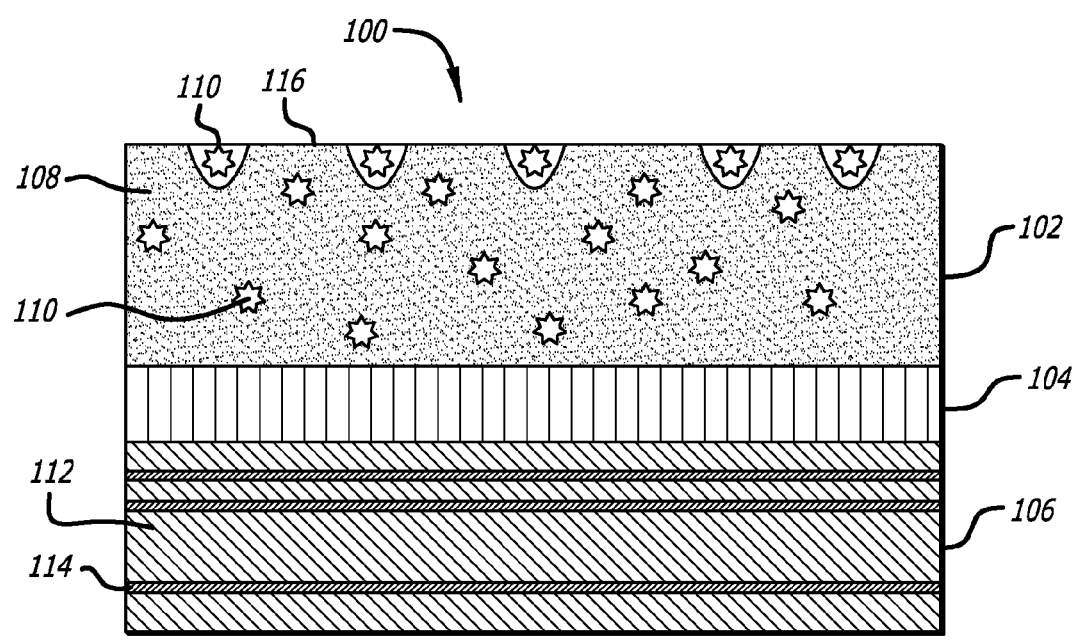
FIG. 1 illustrates a cross sectional view of an exemplary moldable fire resistant composite according to one embodiment.

It will be appreciated that for simplicity and clarity of illustration, where considered appropriate, reference numerals may or may not be repeated among the figures to indicate corresponding or analogous elements. In addition, numerous details are set forth in order to provide a thorough understanding of the example embodiments described herein. Example embodiments described herein may be practiced without certain details and elements, with additional details and elements or in combination with other embodiments described in this specification.

The present application is directed to moldable fire resistant composites and processes for making moldable fire resistant composites. The moldable fire resistant composites can be molded or formed from one or more composite layers containing one or more fire resistant components, fire retardant components, smoke suppressant components, flame-spread-reducing components, heat-dissipating components, heat-transfer-reducing components, structure reinforcing components or combinations thereof. The moldable fire resistant composites can be incorporated into products and materials to increase structural integrity and reduce flammability, flame spread, smoke generation and smoke spread resulting from exposure to heat or fire. The moldable fire resistant composites are easily molded into small, large or complex shapes to accommodate structural, architectural, and aesthetic specifications and designs.

The moldable fire resistant composites can be incorporated into a wide variety of structures, materials, substrates and products including, but not limited to building materials, high-rises, vehicles, ships, aircrafts, spacecrafts, clothing, firefighting equipment, military equipment, weapons, electronic appliances, furniture, metals, iron, steel, stainless steel, wood, plastic, PVC, composites and other structures, materials, substrates and products.

The moldable fire resistant composites herein disclosed can include a series of composite materials and layers including, but not limited to: (1) a base resin layer formed from one or more layers of an intumescent resin mixed with one or more heat-dissipating components; (2) an adhesive layer formed from adhesive; and (3) a reinforced resin layer formed from one or more layers of resin reinforced with a reinforcing structure. The moldable fire resistant composites do not have to contain an adhesive layer and the moldable fire resistant composites can also include a base resin layer adhered directly to a reinforced resin layer without an adhesive layer.

Base Resin Layer

The base resin materials or layers disclosed in this specification can be formed from intumescent resins, heat-dissipating components, accelerators, initiators, fillers and other additives. The volume or weight ratio of intumescent resin, heat-dissipating components, accelerators, initiators, fillers and other additives in the base resin layer can be varied to accommodate different applications, fire standards, smoke standards, building standards or other desired product specifications.

The heat-dissipating component in the base resin layer can be any heat dissipating material including, but not limited to sand, dried silica, anhydrous silicon dioxide ($SiO_2$), gravel, rock, clay, ceramic, polymer or other heat or fire dissipating component capable of increasing the surface area, decreasing the thermal conductivity and/or decreasing the transfer of heat across the moldable fire resistant composite.

The intumescent resin is a substance that imparts fire, flame and/or smoke resistant or suppressant properties to the composite matrix by reducing fire, flame and/or smoke spread. Suitable intumescent resins include unsaturated polyester resins or non-halogenated, unsaturated polyester resins. The intumescent resin can contain accelerators, initiators, fillers and other additives used to improve the hardening, heat resistance, fire resistance and/or smoke resistance characteristics of the intumescent resin.

Initiators initiate the reaction or crosslinking of the intumescent resin and accelerators accelerate the rate of reaction or crosslinking of the intumescent resin. Accelerators can act as initiators and initiators can act as accelerators. The accelerators and initiators used in the base resin can be hardening catalysts that promote exothermic chemical reactions within the base resin layer. The exothermic reactions generate heat, causing the intumescent resin to undergo crosslinking, curing and hardening at a faster rate. Suitable accelerators and initiators include peroxide catalysts, such as methyl ethyl ketone peroxide (MEKP) compounds, cobalt containing compounds, Lewis acids, such as $BF_3$-amine complexes or Lewis bases, such as tertiary amines or imidazole compounds. Suitable MEKP compounds can include, but are not limited to organic peroxides, such as Luperox® DDM-9 manufactured by Arkema Inc. or Hi-Point® PD-1 manufactured by Pergan Marshall, LLC. The cobalt containing compounds can include, but are not limited to cobalt naphthenate, ketone peroxide/cobalt or peroxyester/cobalt.

The intumescent resin can also include additives, fillers, and flame-retardant synergists. Additives, fillers, and flame-retardant synergists can include, but are not limited to water containing additives, such as alumina trihydrate (ATH) that releases water vapor when the intumescent resin is exposed to fire or heat, thereby cooling the moldable fire resistant composite. Additives, fillers, and flame-retardant synergists can also include colloidal antimony pentoxides, such as NYACOL® APE3040 manufactured by NYACOL® Nano Technologies Inc.

Reinforced Resin Layer

The reinforced resin materials and layers disclosed in this specification can be formed from one or more layers of resin reinforced with a reinforcing structure. The resin can include the intumescent resins described in this specification, epoxy resins, phenolic resins, halogenated resins, such as brominated resins, and unsaturated polyester resins that impart fire, flame and/or smoke resistant or suppressant properties by reducing flame and smoke spread. The reinforced resin layer can also contain accelerators, initiators, fillers and other additives used to improve the hardening, heat resistance, fire resistance and smoke resistance characteristics of the reinforced resin layer. The accelerators, initiators, fillers and additives can include, but are not limited to peroxide catalysts such as methyl ethyl ketone peroxide (MEKP) or aluminum hydrates such as alumina tri-hydroxide (ATH). Alumina tri-hydrate (ATH) releases water vapor at a specific temperature, thereby cooling the moldable fire resistant composite when exposed to fire or heat. Other accelerators, initiators, fillers and additives described with respect to the base resin layer can also be used in the reinforced resin layer.

The reinforcing structure of the reinforced resin layer can be any structure that structurally supports the reinforced resin layer and/or imparts fire, flame and/or smoke resistant and suppressant properties to the moldable fire resistant composite. The reinforcing structure can include, glass, crushed glass, fiber, fiber glass, carbon fiber, aramid, basalt, natural fibers, hemp, flax, switch grass, cloth, oriented strand cloth, chopped strand mat, paper, ceramic, metal, metal powder, pearlite, cement, polymer or other reinforcing structure capable of being incorporated into the resin to create a reinforced resin layer. The reinforcing structure can also be treated with or made from fire, flame and/or smoke resistant or suppressant materials.

Adhesive Layer

The adhesive materials or layers disclosed in this specification can be formed from an adhesive capable of adhering layers of the moldable fire resistant composite. The adhesives can be formed from intumescent resins, the reinforced resins or other heat or fire resistant adhesives described in this specification. Other heat and fire resistant adhesives can include, but are not limited to cement adhesives including phosphate cements, fire-resistant concrete adhesives or polymer adhesives, such as acrylic resins, epoxy resins, rubber resins or combinations thereof.

The adhesive layer can be an additional smooth layer of intumescent resin applied to the base resin layer to create a suitable adhesive interface between a base resin layer and a reinforced resin layer. The base resin layers can also be directly adhered to the reinforced resin layers without the need for an adhesive layer. Alternatively, an adhesive layer can be incorporated between a base resin layer and a reinforced resin layer to adhere the layers to one another.

FIG. 1 illustrates a cross sectional view of an exemplary moldable fire resistant composite 100 according to one embodiment. The moldable fire resistant composite 100 can include a series of composite layers including: (1) a base resin layer 102 formed from one or more layers of an intumescent resin 108 mixed with one or more heat-dissipating components 110; (2) an adhesive layer 104 formed from adhesive; and (3) a reinforced resin layer 106 formed from one or more layers of a resin 112 reinforced with a reinforcing structure 114. Alternatively, the moldable fire resistant composite 100 can include a base resin layer 102 adhered directly to a reinforced resin layer 106 without an adhesive layer in between.

When exposed to heat or fire, the intumescent resins 108 or the reinforced resins 112 can release water, swell, increase in surface area or produce char to cool the moldable fire resistant composite 100 or decrease the thermal conductivity of the moldable fire resistant composite 100. The char is a poor heat conductor that impedes heat transfer across the moldable fire resistant composite 100.

The base resin layer 102 can include an intumescent resin 108, heat-dissipating components 110, accelerators, initiators, fillers and other additives described in this specification. The volume or weight ratio of intumescent resin 108, heat-dissipating components 110, accelerators, initiators, fillers and other additives in the base resin layer 100 can be varied to accommodate different applications, fire standards, smoke standards, building standards or other desired product specifications.

The heat-dissipating component 110 in the base resin layer 102 can be any heat dissipating material 110 including, but not limited to sand, dried silica, anhydrous silicon dioxide ($SiO_2$), gravel, rock, clay, ceramic, porous cement, polymer or other heat or fire dissipating component capable of increasing the surface area, decreasing the thermal conductivity and/or decreasing the heat transfer across the moldable fire resistant composite 100.

In an exemplary embodiment, the heat-dissipating component 110 is sand and the weight ratio of intumescent resin to sand in the base resin layer 102 is 100 parts intumescent resin per 100 parts sand. The volume or weight ratio of intumescent resin to sand can be varied to accommodate different applications, fire standards, smoke standards, building standards or other desired product specifications.

In an exemplary embodiment, the intumescent resin 108 is a non-halogenated resin having the trade name FIRE-BLOCK™ manufactured by CCP Composites U.S. In another exemplary embodiment, the intumescent resin 108 is an unsaturated polyester resin having the trade name NOR-SODYNE® H 81269 TF manufactured by CCP Composites U.S.

The reinforced resin layer 106 can include a resin 112 and a reinforcing structure 114. The resin 112 in the reinforcing resin layer 106 can be composed of intumescent resins, halogenated resins such as brominated resins, epoxy resins, phenolic resins and unsaturated polyester resins that impart fire resistant and/or smoke suppressant properties by reducing flame and smoke spread. The reinforced resin layer 106 can also contain accelerators, initiators, fillers and other additives described in this specification to improve the hardening, heat resistance, fire resistance and smoke resistance characteristics of the reinforced resin layer 106. The accelerators, initiators, fillers and additives can include, but are not limited to peroxide catalysts such as methyl ethyl ketone peroxide (MEKP) or aluminum hydrates such as alumina tri-hydroxide (ATH). Alumina trihydrate (ATH) releases water vapor at a specific temperature, thereby cooling the moldable fire resistant composite when exposed to fire or heat.

In an exemplary embodiment, the reinforced resin layer 106 contains a halogenated, unsaturated polyester resin 112 and alumina trihydrate (ATH). The weight ratio of halogenated, unsaturated polyester resin 112 to alumina trihydrate (ATH) in the reinforced resin layer 106 is 100 parts halogenated unsaturated polyester resin per 100 parts alumina trihydrate (ATH). The volume or weight ratio of halogenated, unsaturated polyester resin to alumina trihydrate (ATH) can be varied to accommodate different applications, fire standards, smoke standards, building standards or other desired product specifications.

In another exemplary embodiment, the resin 112 in the reinforced resin layer 106 is Hetron™ FR 650T-20 manufactured by Ashland Inc.

The reinforcing structure 114 can be any structure that supports the reinforced resin layer 106 and/or imparts fire resistant or smoke suppressant properties to the moldable fire resistant composite 100. The reinforcing structure 114 can include glass, crushed glass, fiber, fiber glass, carbon fiber, aramid, basalt, natural fibers, hemp, flax, switch grass, cloth, oriented strand cloth, chopped strand mat, paper, ceramic, metal, metal powder, pearlite, cement, polymer or other reinforcing structure capable of being incorporated into the resin to create a reinforced resin layer. The reinforcing structure 114 can also be treated or made from fire, flame and/or smoke resistant or suppressant materials.

The adhesive layer 104 can include an adhesive capable of adhering layers of the moldable fire resistant composite 100. The adhesive layer 104 can include the intumescent resins, the reinforced resins or other heat and fire resistant adhesives disclosed in this specification. Other heat and fire resistant adhesives can include, but are not limited to cement adhesives including phosphate cements, hydraulic cement aggregates, fire-resistant concrete or polymer adhesives, such as acrylic resins, epoxy resins, rubber resins or combinations thereof.

The moldable fire resistant composite 100 can be formed from multiple base resin layers 102, adhesive layers 104 and reinforced resin layers 106. Each layer of base resin 102, adhesive 104 and reinforced resin 106 can be stacked on, adhered to or placed in contact with other layers (102, 104, and 106) in any order to form a moldable, fire resistant, composite matrix 100. Alternatively, the base resin layers 102 can be adhered directly to the reinforced resin layers 106 without an adhesive layer 104 between the base resin layer 102 and reinforced resin layer 106.

In an exemplary embodiment illustrated in FIG. 1, one or more layers of base resin 102 are stacked on, adhered to or placed in contact with one or more layers of adhesive 104, and one or more layers of adhesive 104 are stacked on, adhered to or placed in contact with one or more layers of reinforced resin 106 to form a first layer of base resin 102, a second layer of adhesive 104 and a third layer of reinforced resin 106 in the moldable, fire resistant, composite matrix 100.

In another exemplary embodiment illustrated in FIG. 1, an outer, exposed surface 116 of the moldable fire resistant composite 100 is made of a mixture of intumescent resin 108 and heat dissipating material 110. The ratio of intumescent resin 108 to heat dissipating material 110 can be varied to modify the heat, fire and/or smoke resistant or suppressant properties of exposed surfaces 116 of the moldable fire resistant composite 100 that are most susceptible to heat and fire.

Figure 2:
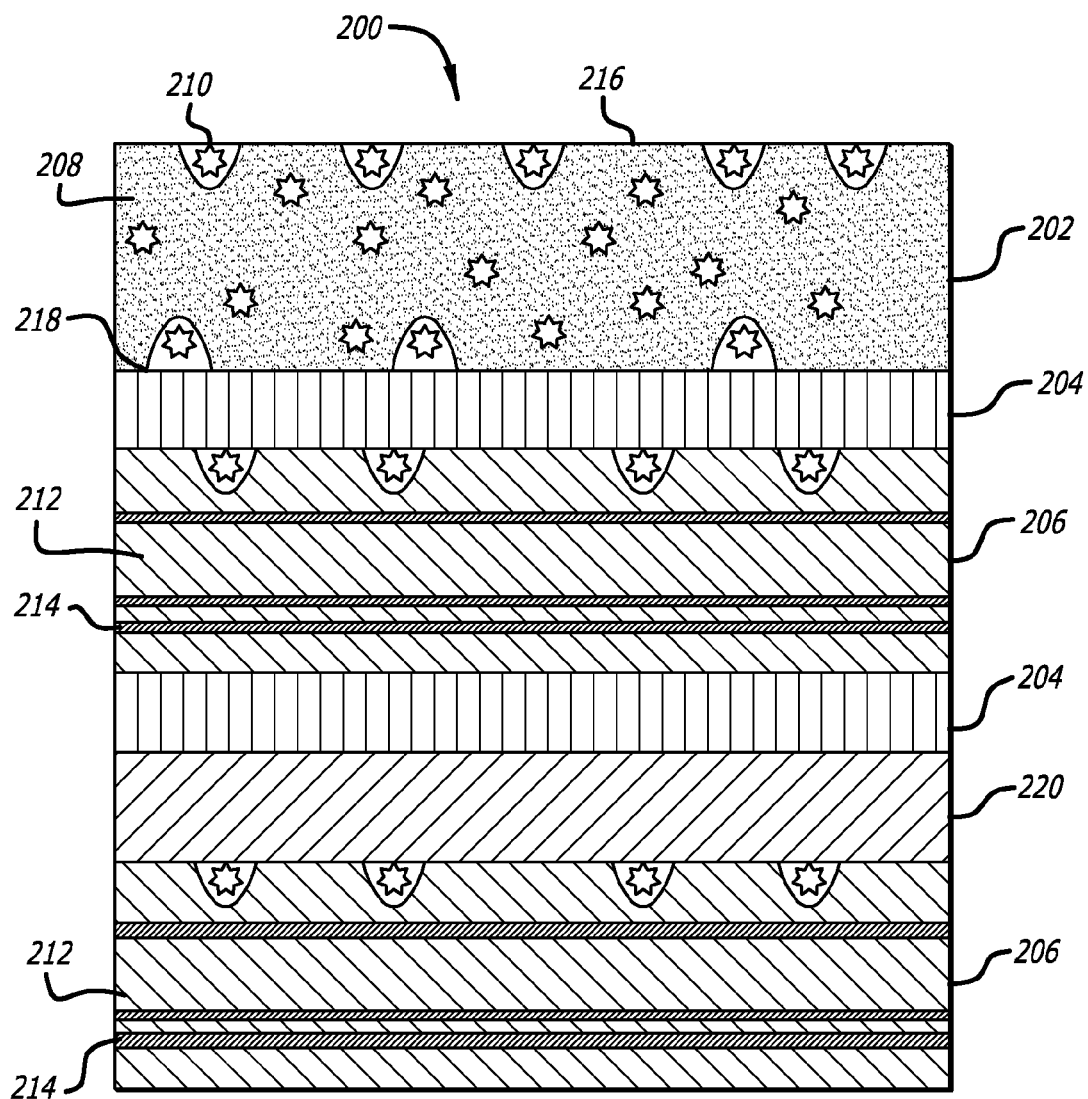
FIG. 2 illustrates a cross sectional view of an exemplary moldable fire resistant composite according to another embodiment.

FIG. 2 illustrates a cross sectional view of an exemplary moldable fire resistant composite 200 according to another embodiment. The moldable fire resistant composite 200 is composed of the same or similar composite layers discussed with respect to FIG. 1 including: (1) base resin layers 202 comprising intumescent resin 208 and a heat dissipating component 210; (2) adhesive layers 204 comprising an adhesive; (3) reinforced resin layers 206 comprising a resin 212 and reinforcing structure 214; and (4) a core 220 layer imparting stiffness and or insulation to the fire retardant composite 200. The fire resistant composite 200 can consist of any number of base resin layers 202, adhesive layers 204, reinforced resin layers 206 and core layers 220. Alternatively, the moldable fire resistant composite 200 can include base resin layers adhered directly to reinforced resin layers 206 and core layers 220 adhered directly to reinforced resin layers 206 without adhesive layers 204 between the other layers. The number of layers and configuration of the layers in the composite matrix 200 can be modified to meet material specifications and produce specific heat, fire and smoke resistant properties.

FIG. 2 illustrates a cross sectional view of a moldable fire resistant composite 200 having a base resin layer 202, two adhesive layers 204, two reinforced resin layers 206 and a core layer 220. The core layer 220 of the moldable fire resistant composite 200 can be incorporated with or adhered to any other composite layer to add stiffness and/or insulation to the moldable fire resistant composite 200. The core layer 220 can be formed from foam, balsa wood, plywood, cement board or other material capable of adding stiffness and/or insulation to the moldable fire resistant composite 200. FIG. 2 illustrates a core layer 220 adhered directly to a reinforced layer 206. The core layer 220 can also be adhered to a reinforced resin layer 206 with an adhesive layer 204 in between. The core layer 220 can also be adhered directly to a base resin layer 202 or can be adhered to a base resin layer 202 with an adhesive layer 204 in between. The core layer 220 can also be sandwiched between two reinforced resin layers 206 or any two layers to support and/or insulate the layers.

The outer surfaces 216 of the moldable fire resistant composite 200 can include a mixture of intumescent resin 208 and heat dissipating material 210. The reinforced resin layers 206 can also include a heat dissipating material 210. A heat dissipating material 210 can be dispersed within an interface 218 between any two layers of the moldable fire resistant composite 200 to protect the interface and adhesion of two layers. For instance, a heat dissipating material 210 can be provided at an interface 218 between a base resin layer 202 and a reinforced resin layer 206 if the base resin layer 202 is adhered directly to the reinforced resin layer 206. A heat dissipating material 210 can also be provided or dispersed within an interface 218 between an adhesive layer 204 and another composite layer of the moldable fire resistant composite 200 to assure adhesion and protect the adhesive interface 218 from heat and fire.

Figure 3:
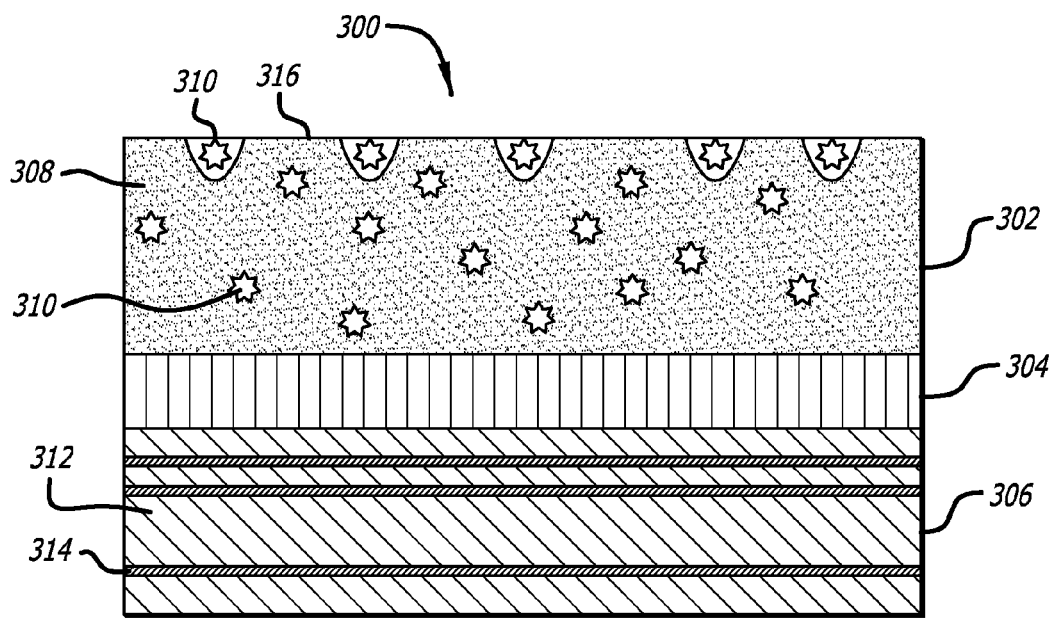
FIG. 3 illustrates a cross sectional view of an exemplary moldable fire resistant composite according to another embodiment.

FIG. 3 illustrates a cross sectional view of an exemplary moldable fire resistant composite 300 according to another embodiment. The moldable fire resistant composite 300 can include a series of composite layers including: (1) a gel coat layer 302 formed from one or more layers of gel coat 308 mixed with one or more heat-dissipating components 310; (2) an adhesive layer 304 formed from adhesive; and (3) a reinforced resin layer 306 formed from one or more layers of a resin 312 reinforced with a reinforcing structure 314. When exposed to heat or fire, the gel coat 308 and the reinforced resins 312 can release water, swell, increase in surface area and/or produce char to decrease the thermal conductivity and heat transfer across the moldable fire resistant composite 300 and cool the composite.

The gel coat layer 302 can include a gel coat 308, heat-dissipating components 310, accelerators, initiators, fillers and other additives, such as those described with respect to FIG. 1. The volume or weight ratio of gel coat 308, heat-dissipating components 310, accelerators, initiators, fillers and other additives in the gel coat layer 302 can be varied to accommodate different applications, fire standards, smoke standards, building standards or other desired product specifications.

The gel coat 308 can be a halogenated or non-halogenated resin, such as a polyester resin. In an exemplary embodiment, the gel coat 308 is FIREBLOCK™ 2330 PAWK745 manufactured by CCP Composites U.S.

The heat-dissipating component 310 in the gel coat layer 302 can be any heat dissipating material 310 including, but not limited to sand, dried silica, anhydrous silicon dioxide ($SiO_2$), gravel, rock, clay, ceramic, porous cement, polymer or other heat or fire dissipating component capable of increasing the surface area and/or decreasing the heat transfer across the moldable fire resistant composite.

The reinforced resin layer 306 can include a resin 312 and a reinforcing structure 314. The resin 312 in the reinforcing resin layer 306 can be composed of intumescent resins described is this specification or halogenated, unsaturated polyester resins that impart fire, flame and/or smoke resistant or suppressant properties by reducing flame and smoke spread. The reinforced resin layer 306 can also contain accelerators, initiators, fillers and other additives to improve the hardening, heat resistance, fire resistance or smoke resistance characteristics of the reinforced resin layer 306. The accelerators, initiators, fillers and additives can include, but are not limited to peroxide catalysts such as methyl ethyl ketone peroxide (MEKP) or aluminum hydrates such as alumina tri-hydroxide (ATH). Alumina trihydrate (ATH) releases water vapor at a specific temperature, thereby cooling the moldable fire resistant composite 300 when exposed to fire or heat.

The reinforcing structure 314 can be any structure that supports the reinforced resin layer 306 and/or imparts fire resistant or smoke suppressant properties to the moldable fire resistant composite 300. The reinforcing structure 314 can include, glass, fiber, fiber glass, carbon fiber, cloth, oriented strand cloth, chopped strand mat, paper, ceramic, metal, cement, fire-resistant polymer or other reinforcing structure capable of being incorporated into the resin to create a reinforced resin layer 306. The reinforcing structure 314 can also be treated or made from flame resistant or smoke suppressant materials.

The adhesive layer 304 can include an adhesive capable of adhering layers of the moldable fire resistant composite 300. The adhesive layer 304 can be formed from intumescent resins, reinforced resins or other heat and fire resistant adhesives described in this specification. Other heat and fire resistant adhesives can include, but are not limited to cement adhesives including phosphate cements, fire-resistant concrete or polymer adhesives, such as acrylic resins, epoxy resins, rubber resins or combinations thereof.

The moldable fire resistant composite 300 can be formed from multiple gel coat layers 302, adhesive layers 304 and reinforced resin layers 306. Each layer of gel coat 302, adhesive 304 and reinforced resin 306 can be stacked on, adhered to or placed in contact with other layers (302, 304, and 306) in any order to form a moldable, fire resistant, composite matrix 300.

In an exemplary embodiment illustrated in FIG. 3, one or more layers of gel coat 302 are stacked on, adhered to or placed in contact with one or more layers of adhesive 304, and one or more layers of adhesive are stacked on, adhered to or placed in contact with one or more layers of reinforced resin 306 to form a first layer of gel coat 302, a second layer of adhesive 304 and a third layer of reinforced resin 306 in the moldable, fire resistant, composite matrix 300. Alternatively, the moldable fire resistant composite 300 can include a gel coat layer 302 adhered directly to a reinforced resin layer 306 without an adhesive layer in between.

In another exemplary embodiment illustrated in FIG. 3, an outer, exposed surface 316 of the moldable fire resistant composite 300 is made of a mixture of gel coat 308 and heat dissipating material 310. The ratio of gel coat 308 to heat dissipating material 310 can be varied to modify the heat, fire and smoke resistant properties of exposed surfaces of the moldable fire resistant composite 300 that are most susceptible to heat and fire.

Figure 4:
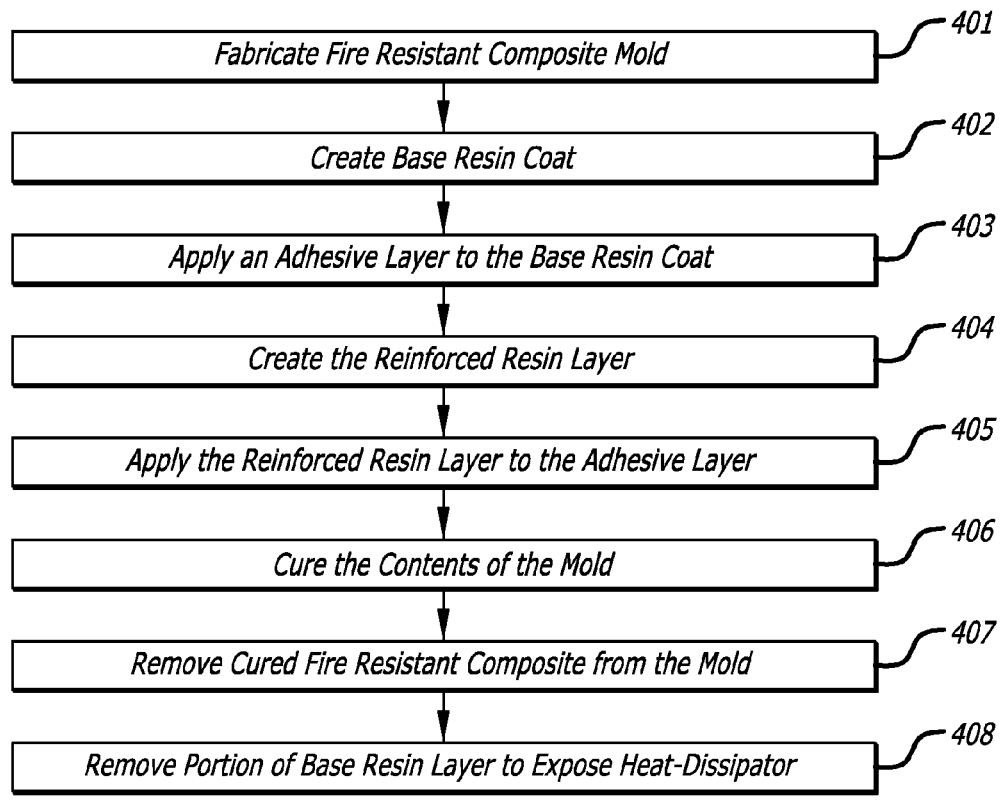
FIG. 4 illustrates a process flow diagram of a process for manufacturing an exemplary moldable fire resistant composite according to one embodiment.
Figure 5A:
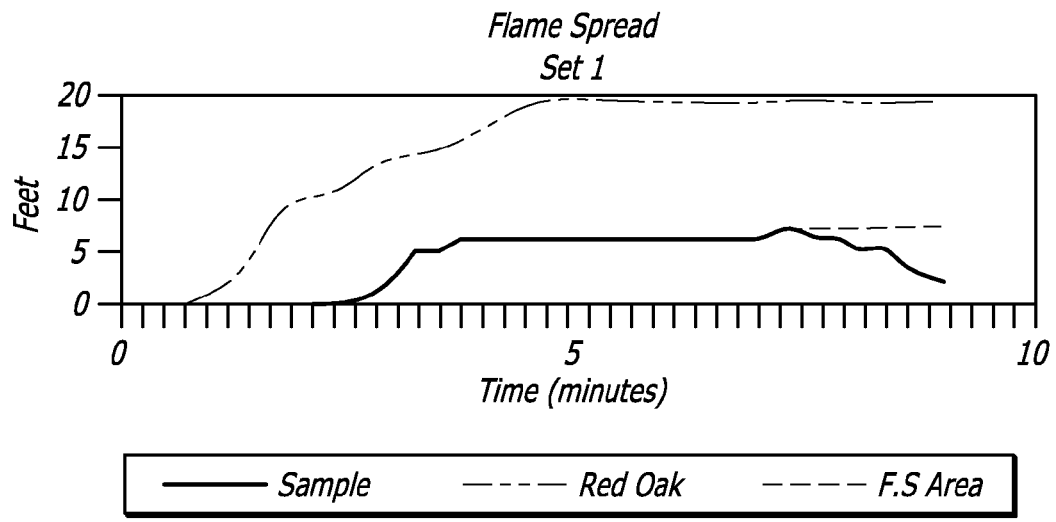
FIGS. 5A-7B illustrate the ASTM E84-10 test results for an exemplary moldable fire resistant composite according to one embodiment.
Figure 5B:
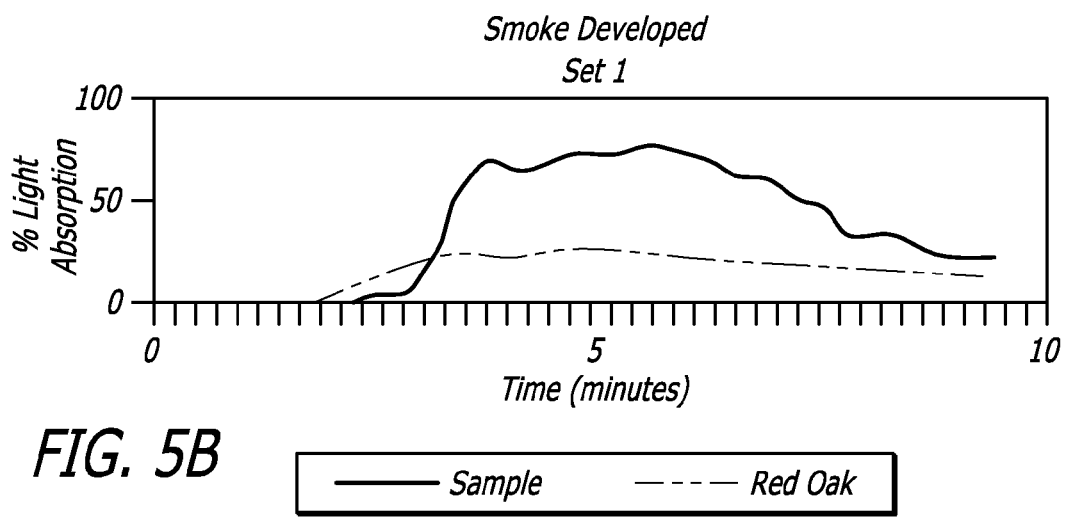
Figure 6A:
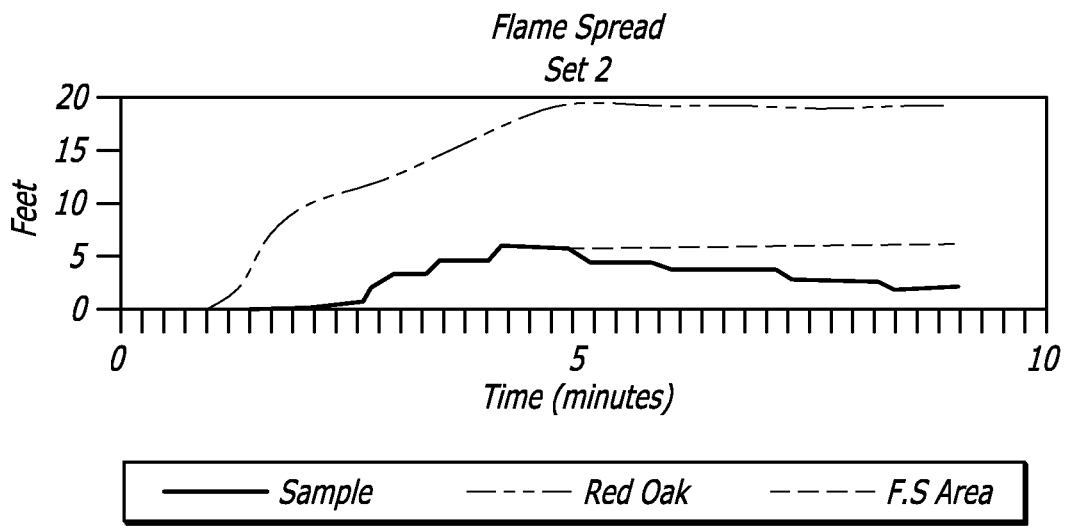
Figure 6B:
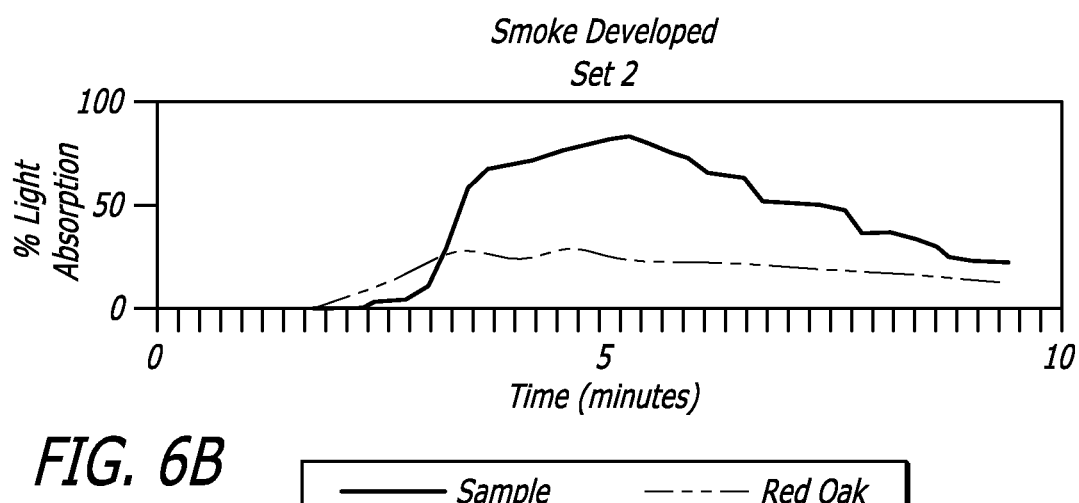
Figure 7A:
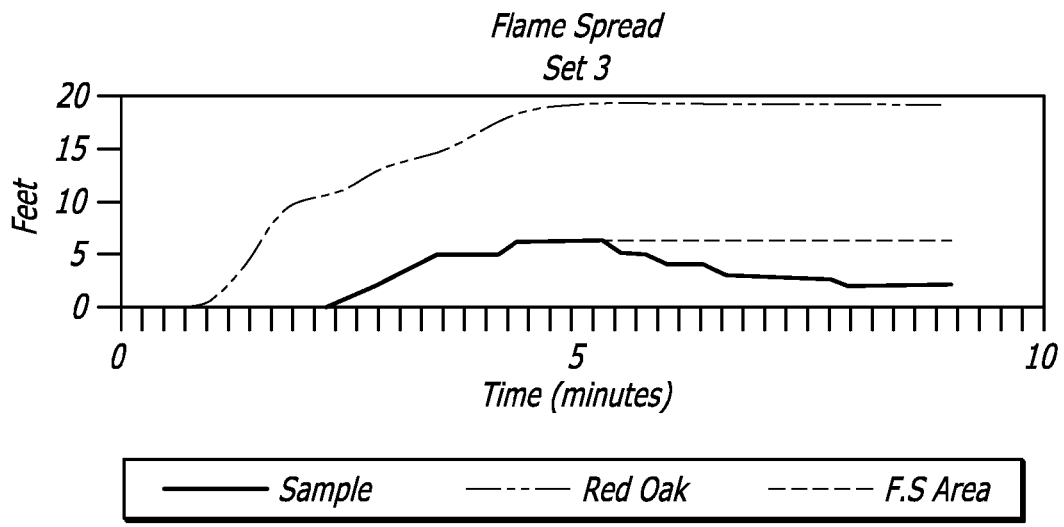
Figure 7B:
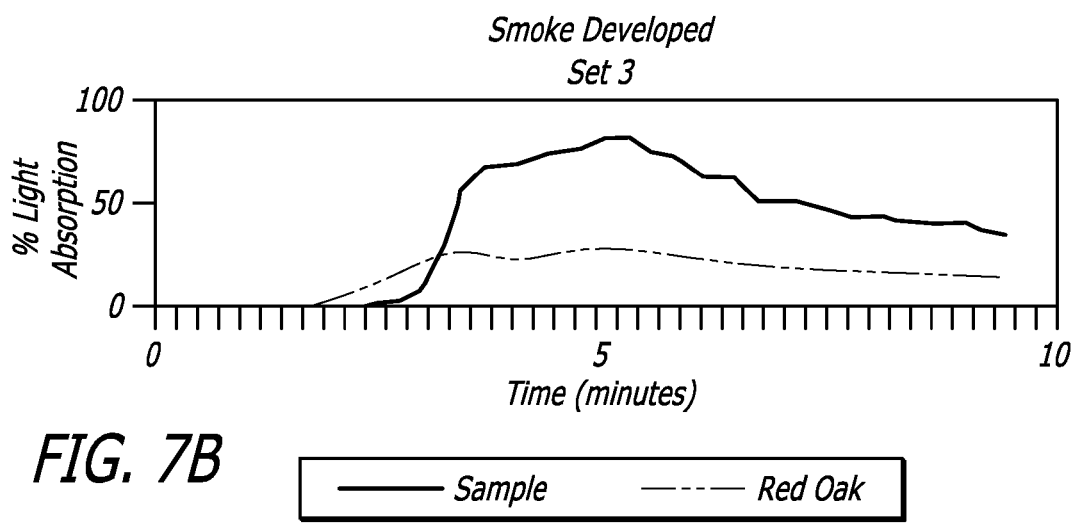
Figure 8A:
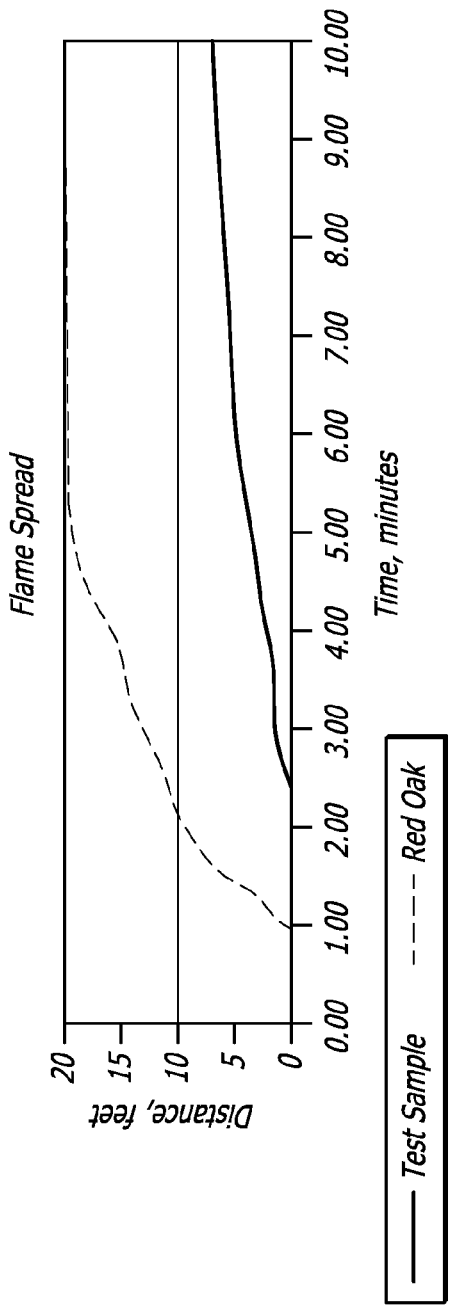
FIGS. 8A-10B illustrate the ASTM E84-10 test results for an exemplary reinforced resin layer according to one embodiment.
Figure 8B:
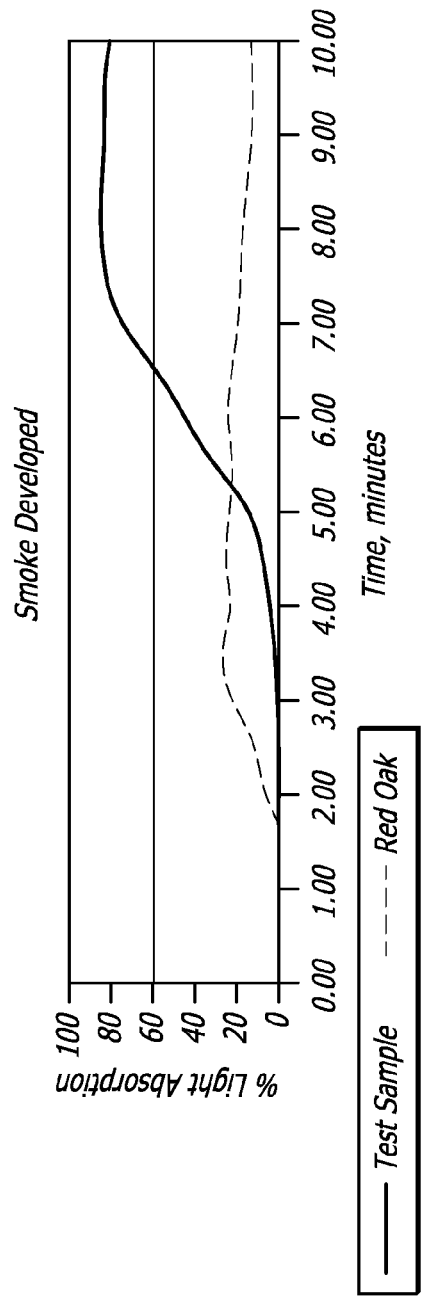
Figure 9A:
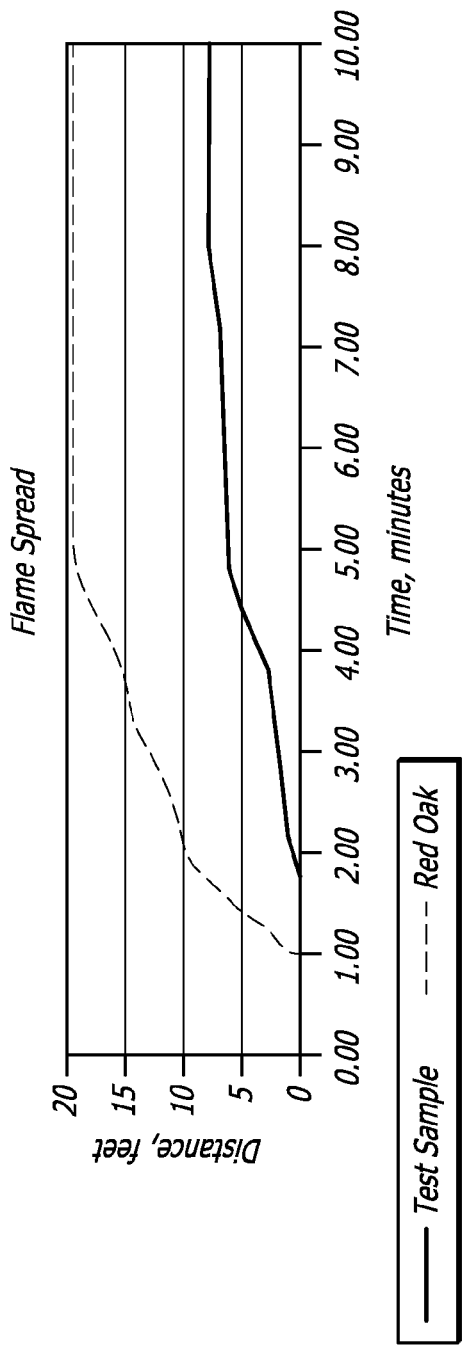
Figure 9B:
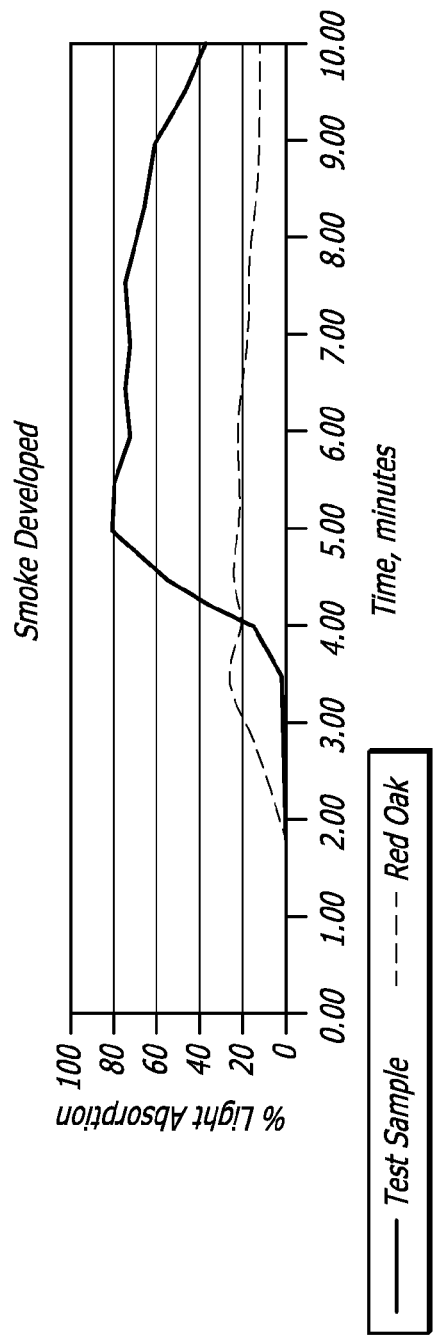
Figure 10A:
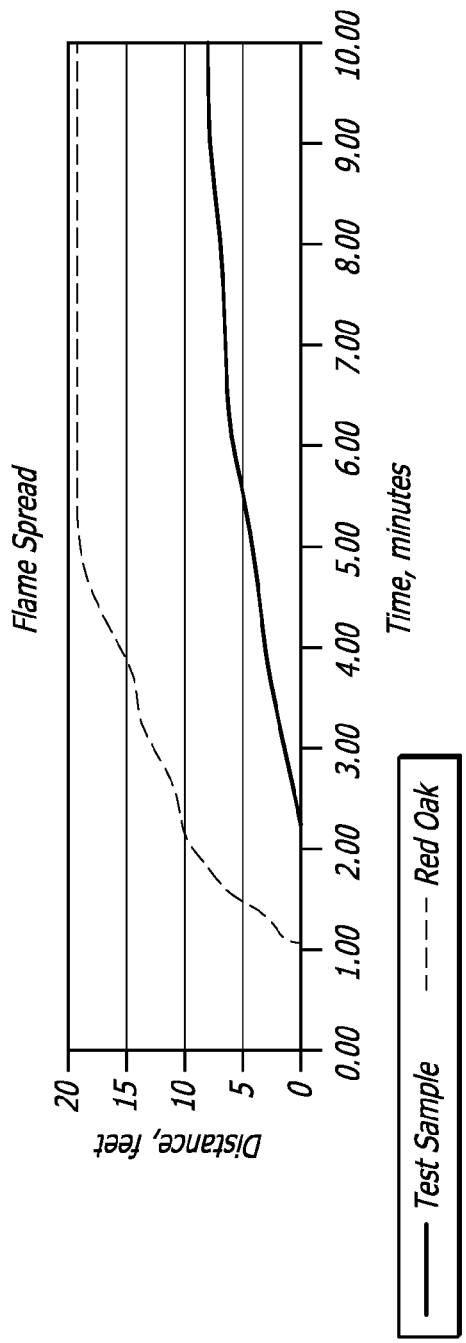
Figure 10B:
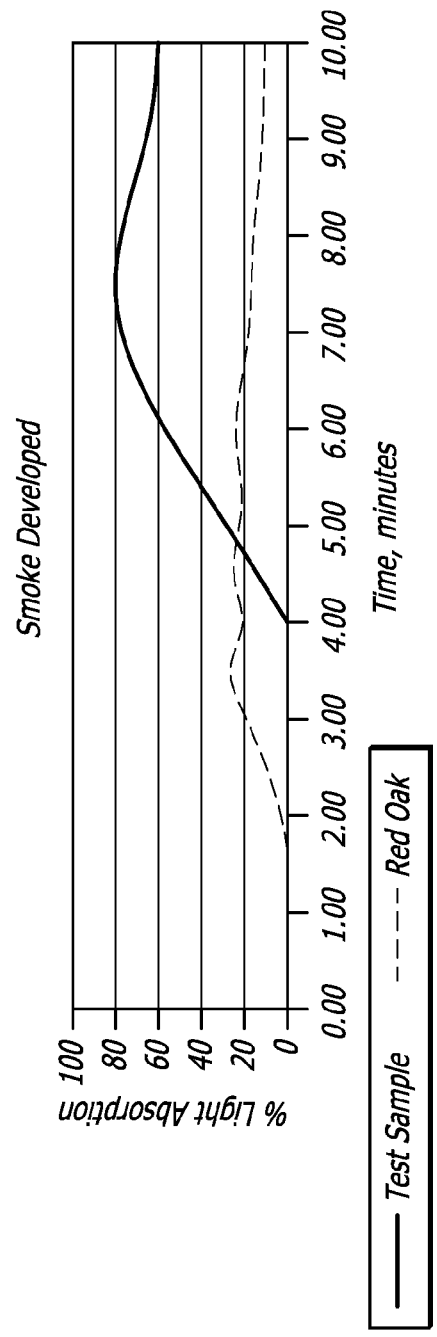
Figure 11A:
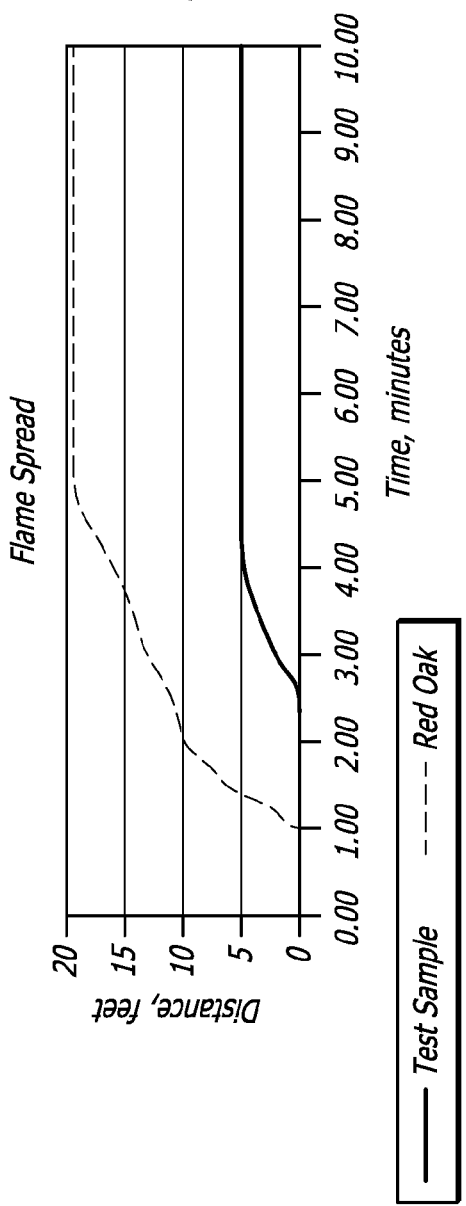
FIGS. 11A-13B illustrate the ASTM E84-10 test results for an exemplary moldable fire resistant composite according to another embodiment.
Figure 11B:
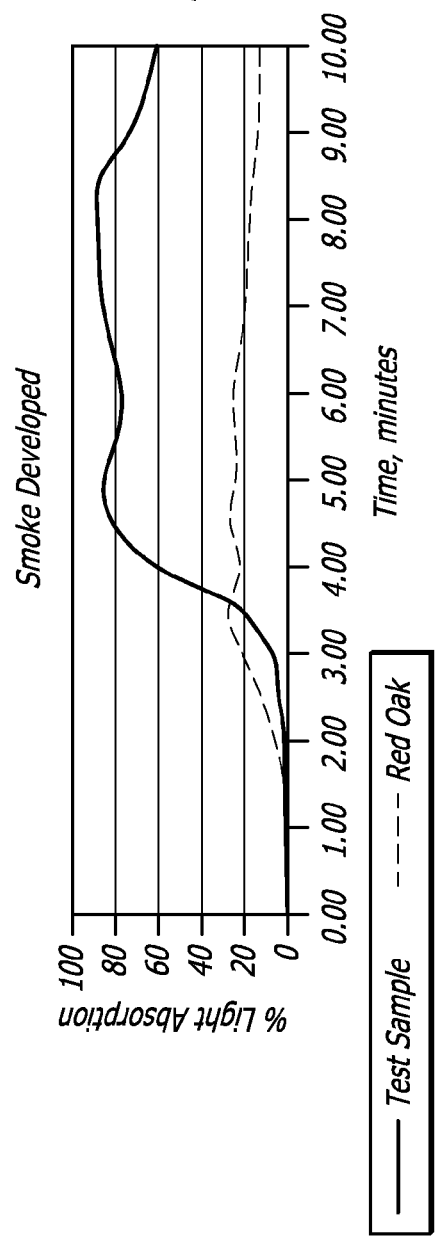
Figure 12A:
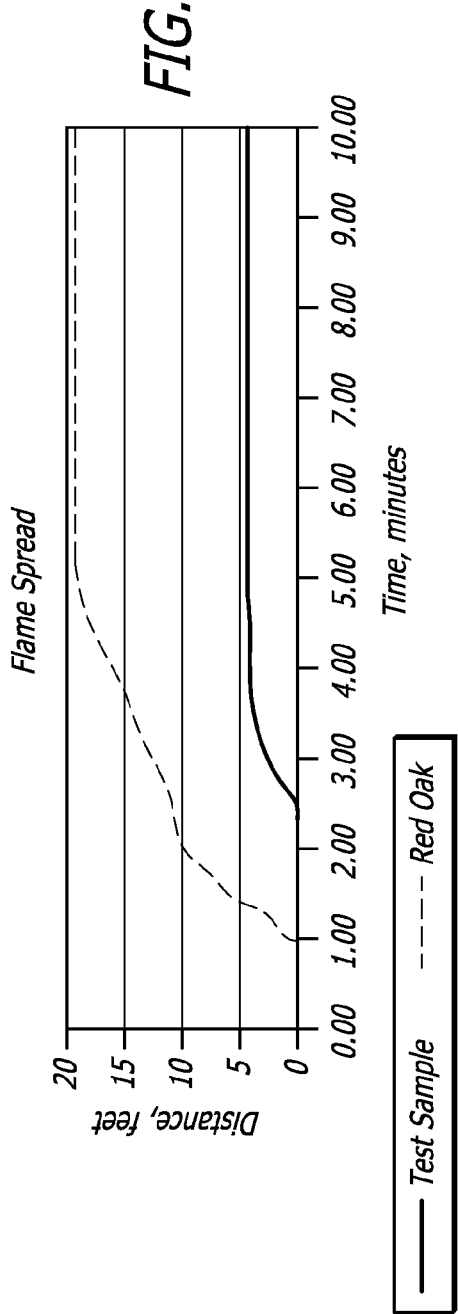
Figure 12B:
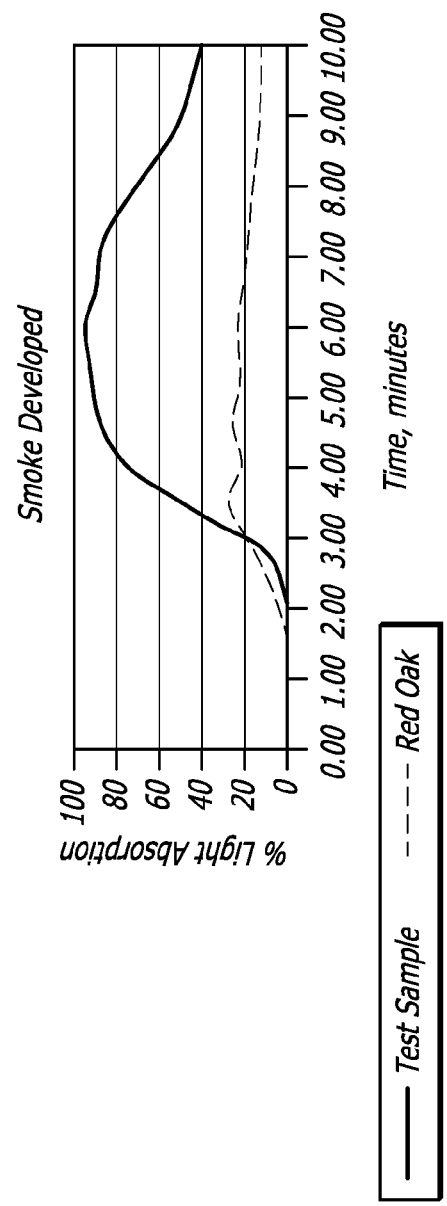
Figure 13A:
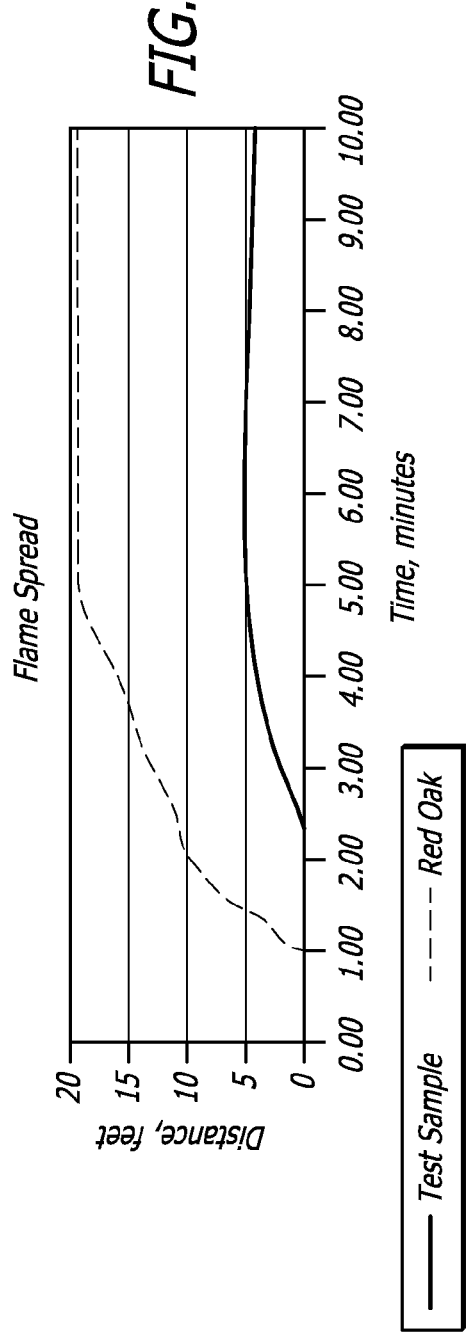
Figure 13B:
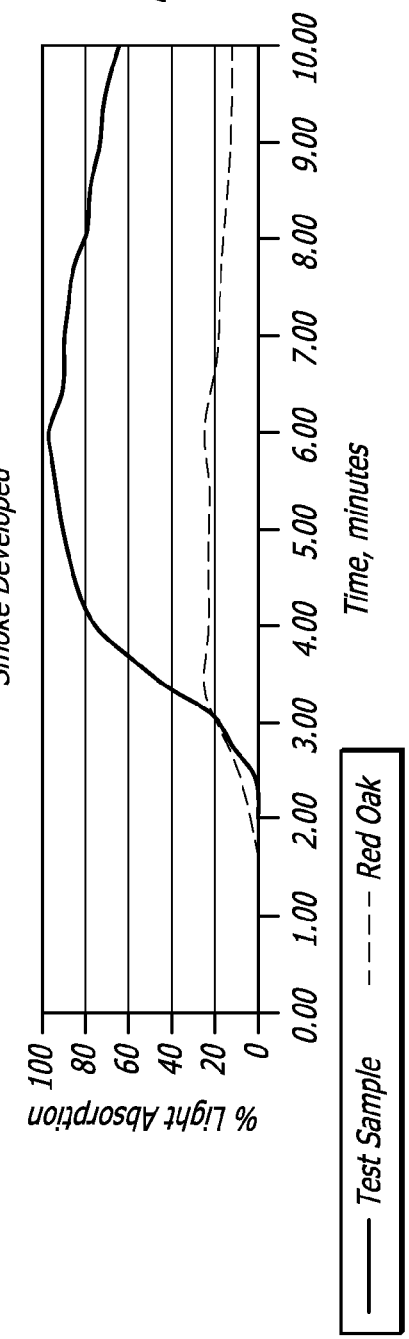
Figure 14:
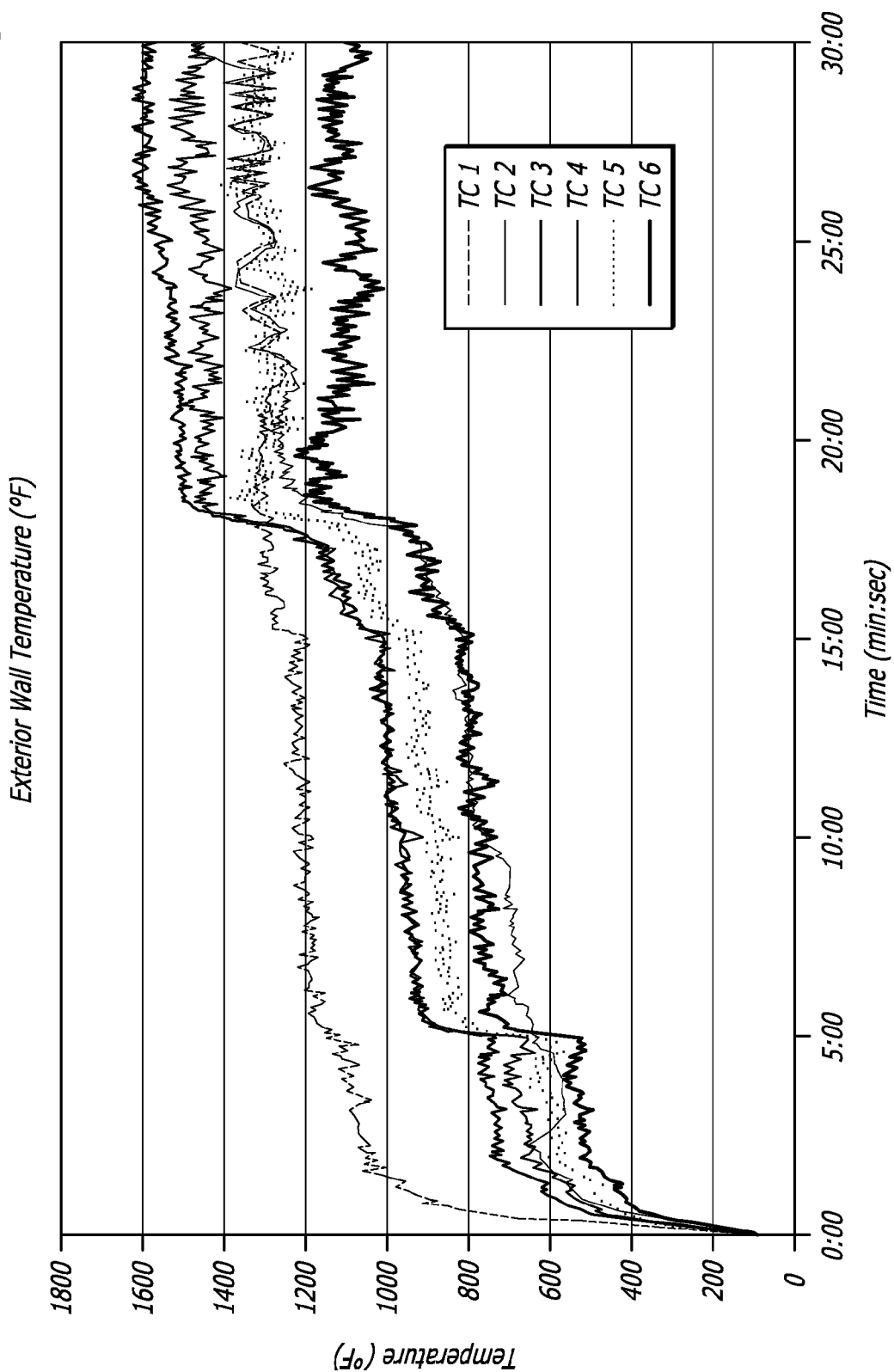
FIGS. 14-24 illustrate the temperature data per time for an NFPA 285 Test performed on exemplary moldable fire resistant composite panels.
Figure 15:
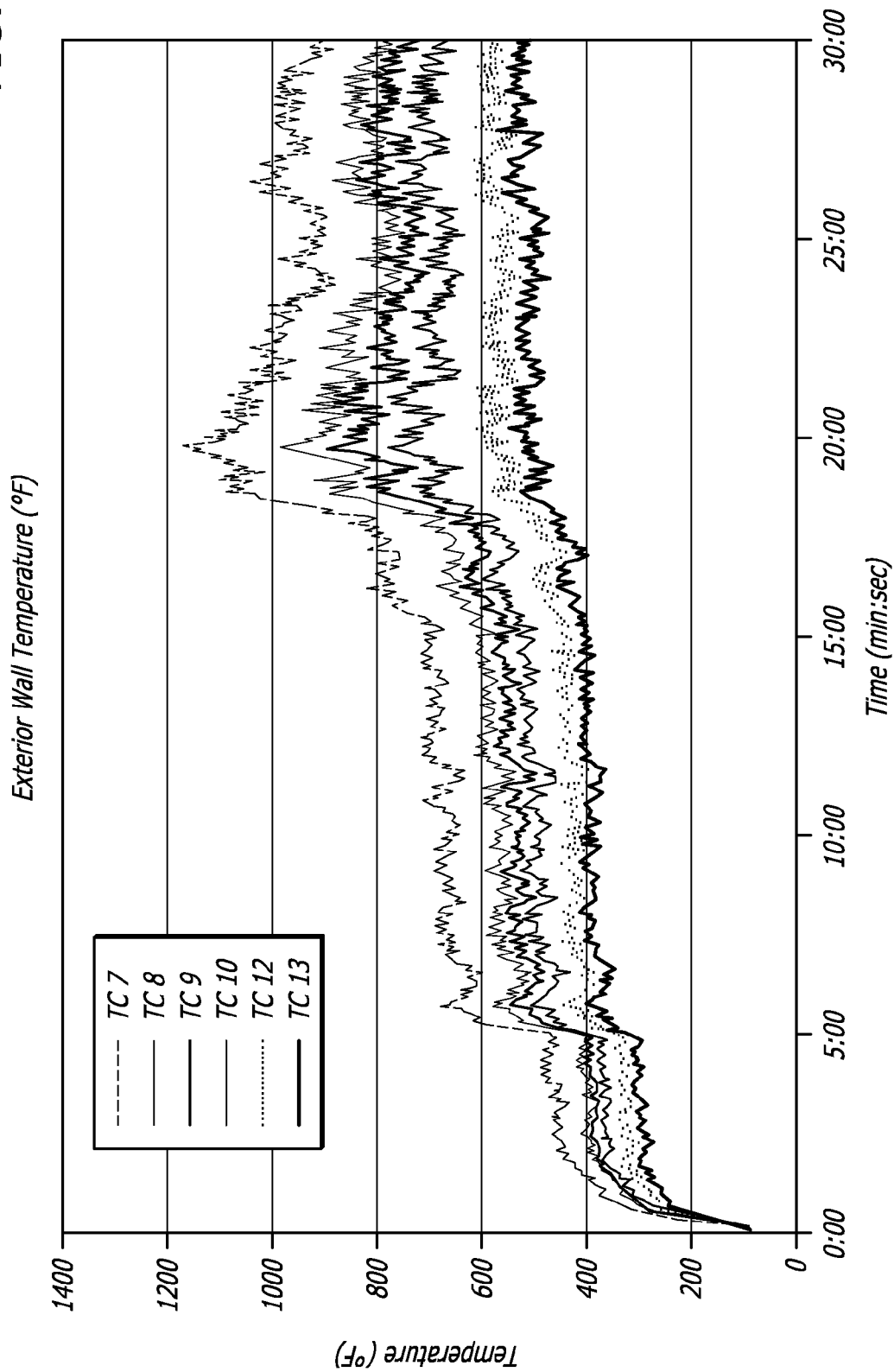
Figure 16:
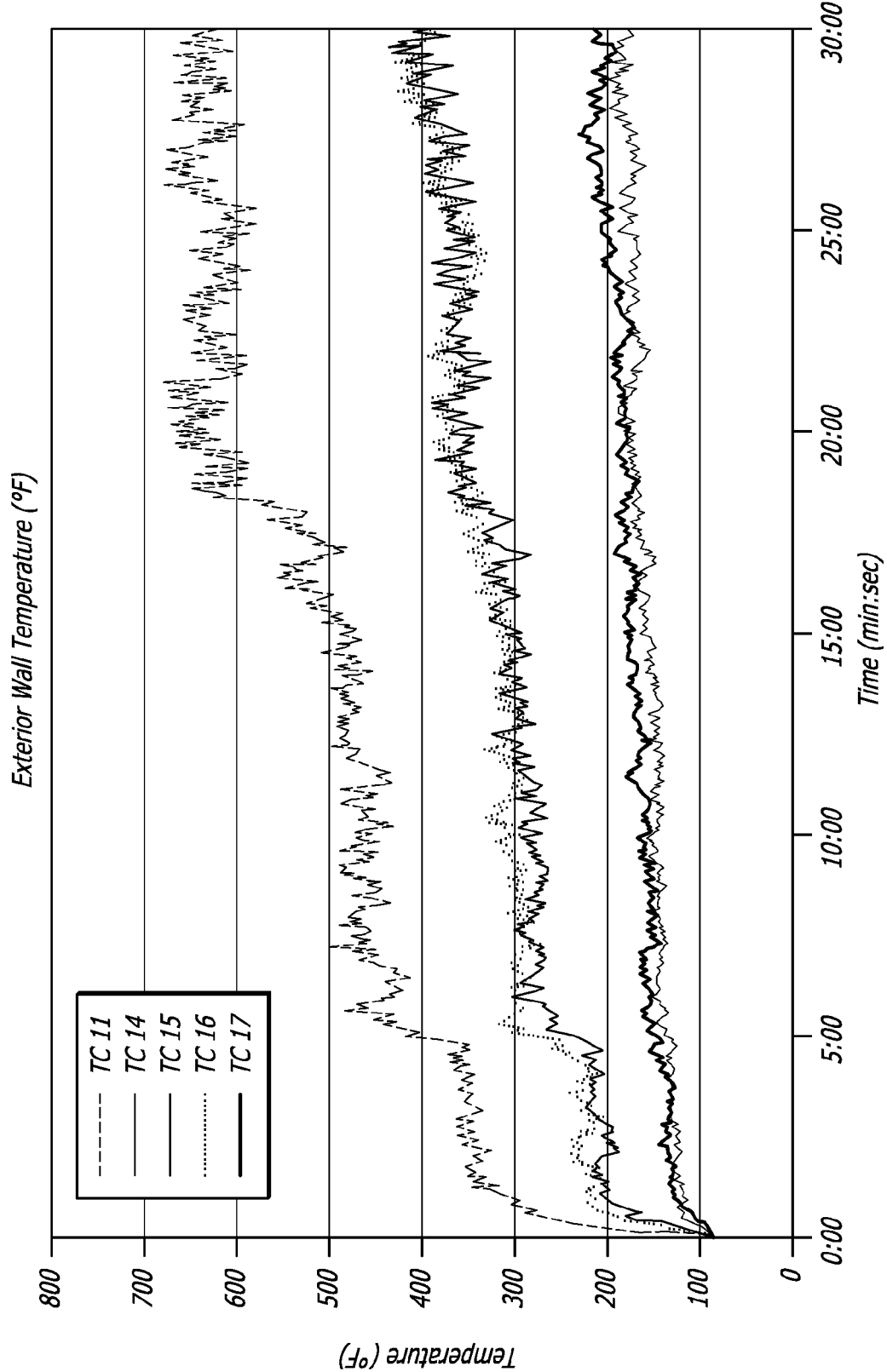
Figure 17:
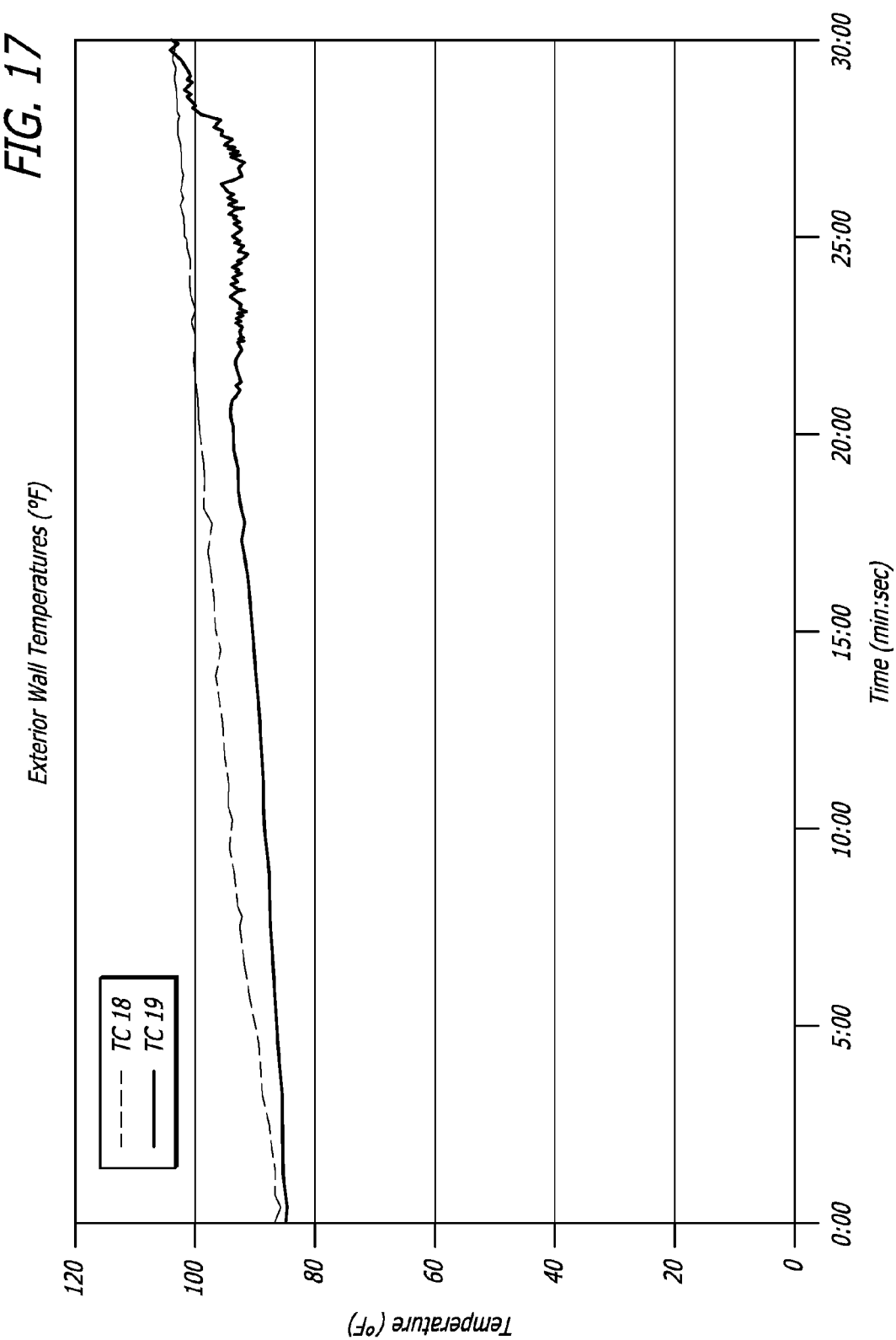
Figure 18:
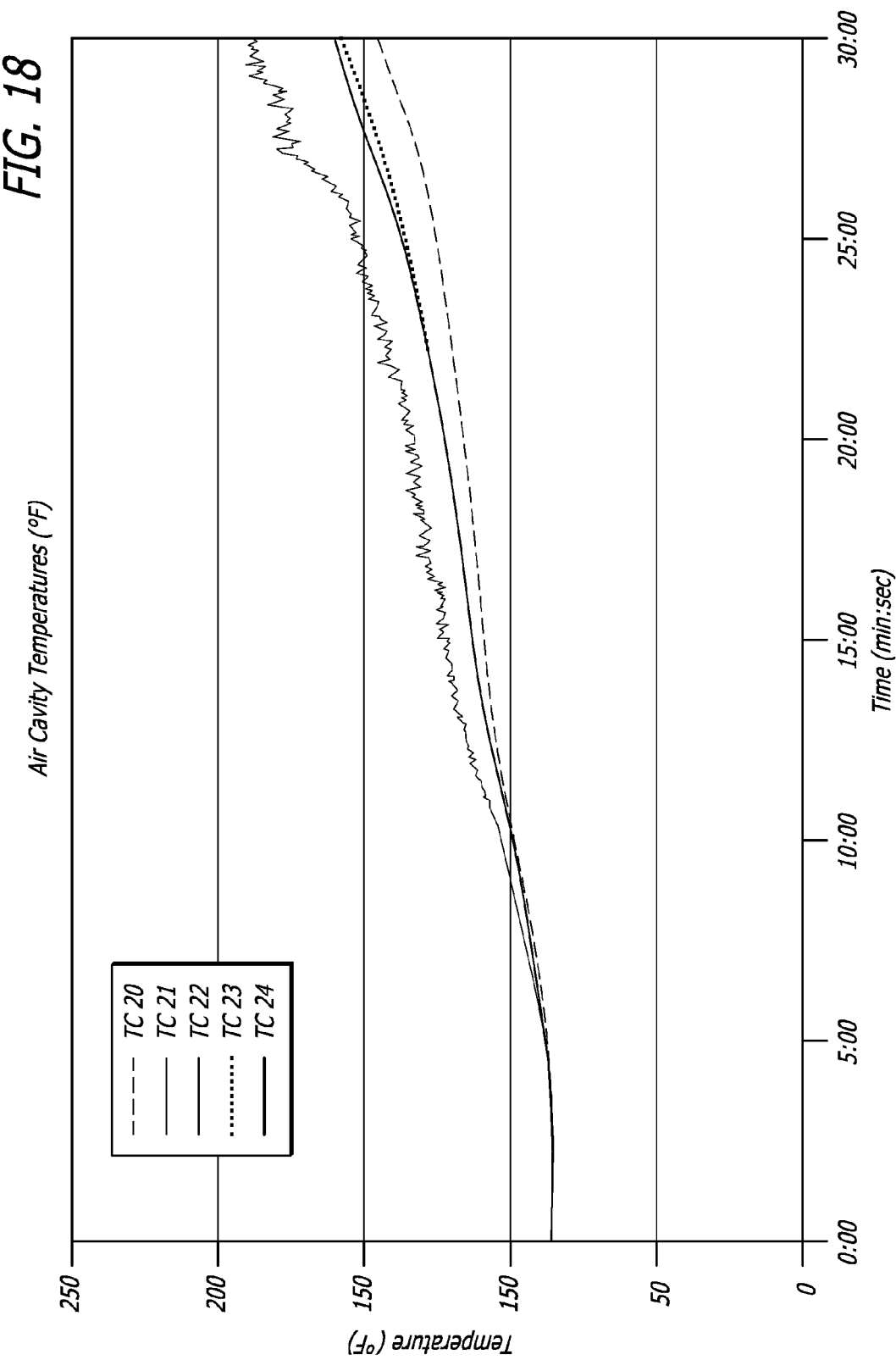
Figure 19:
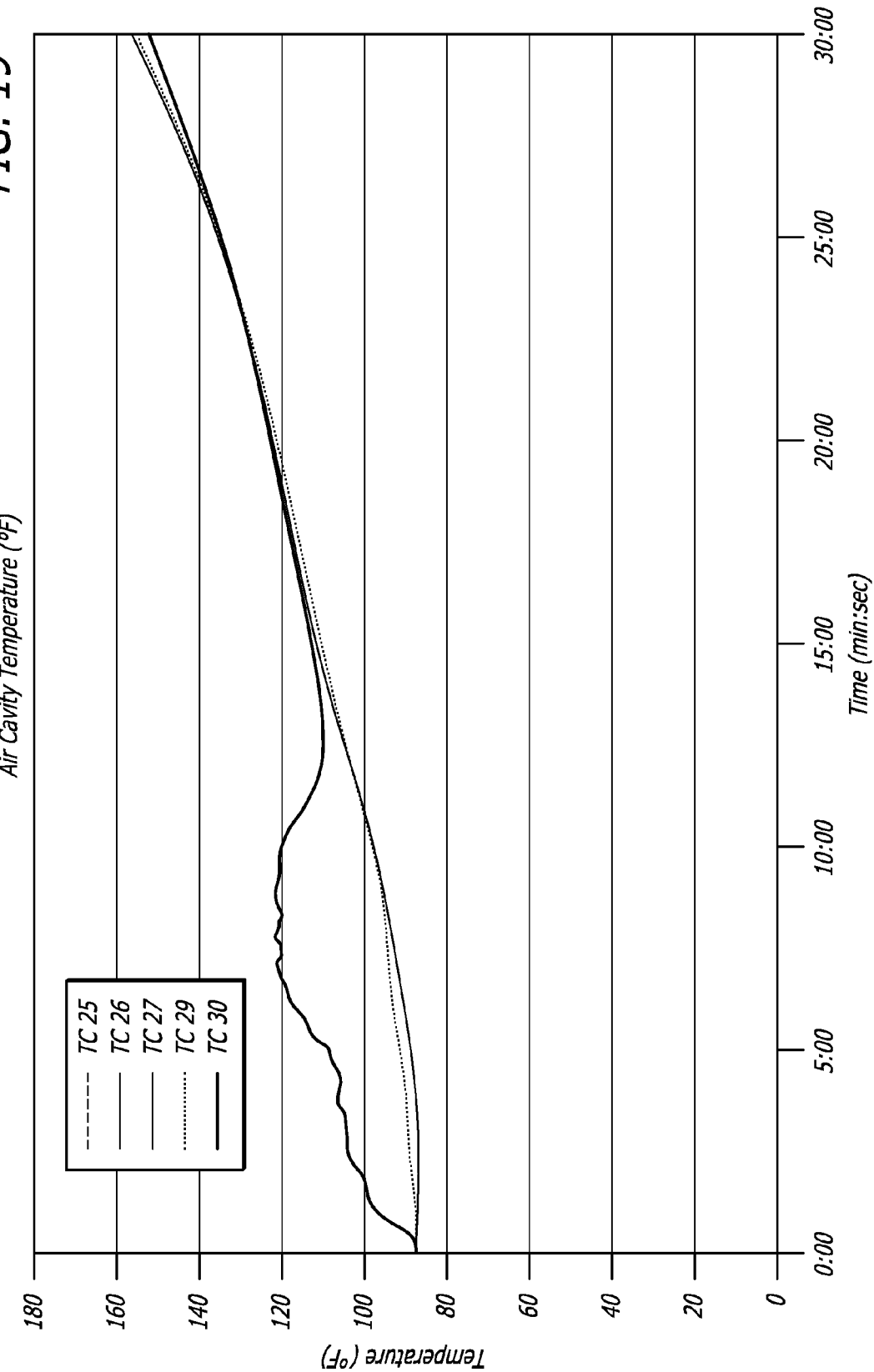
Figure 20:
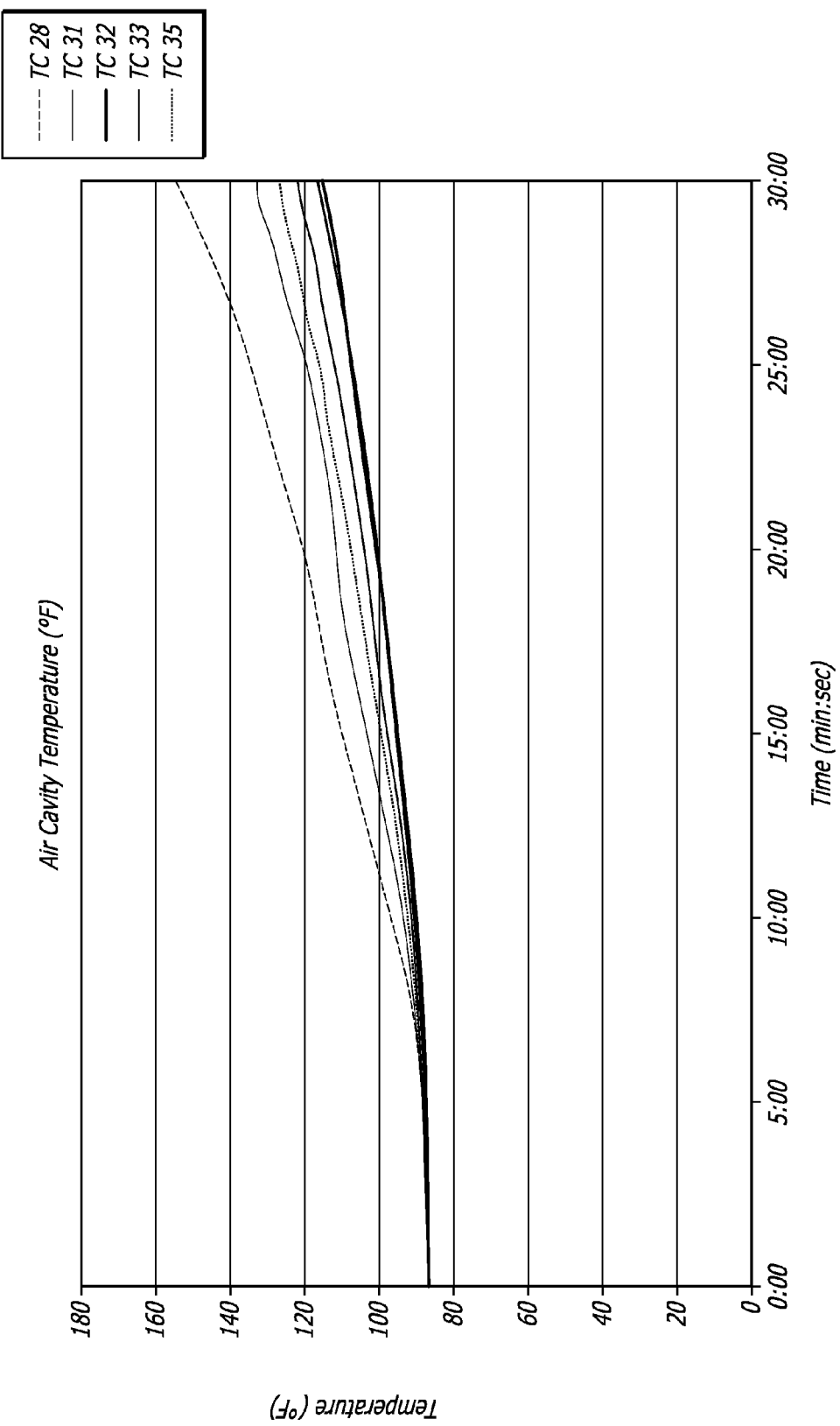
Figure 21:
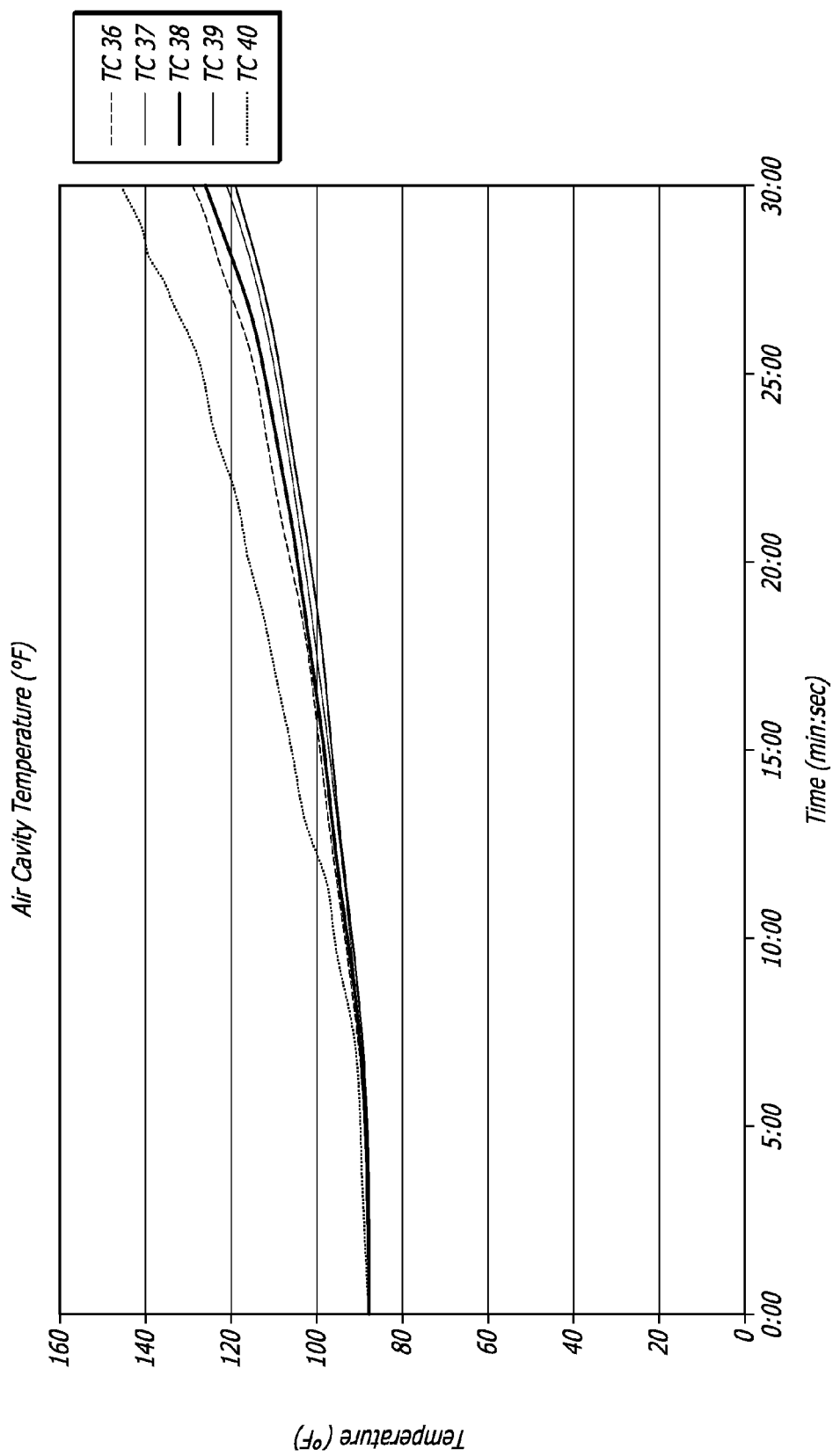
Figure 22:
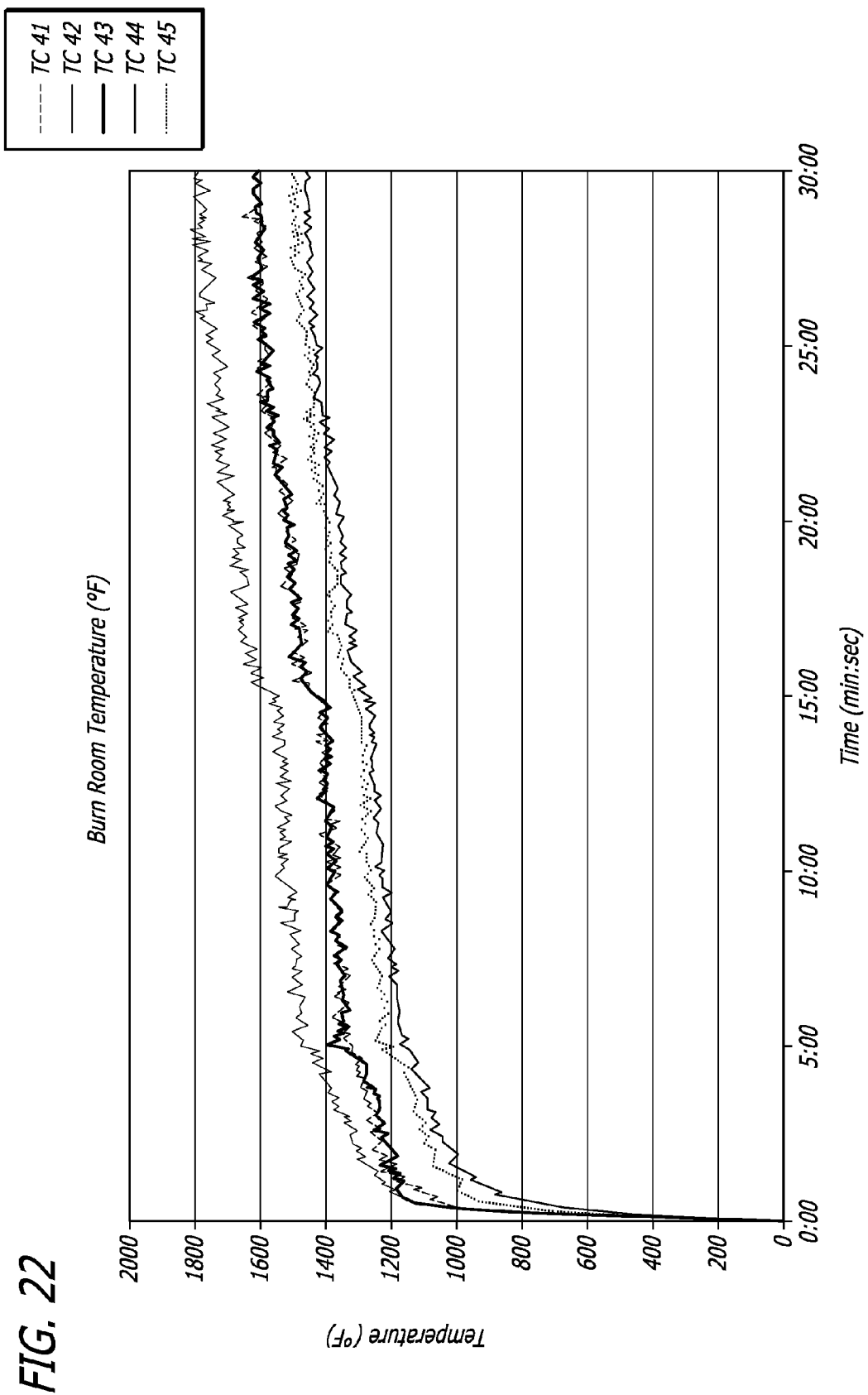
Figure 23:
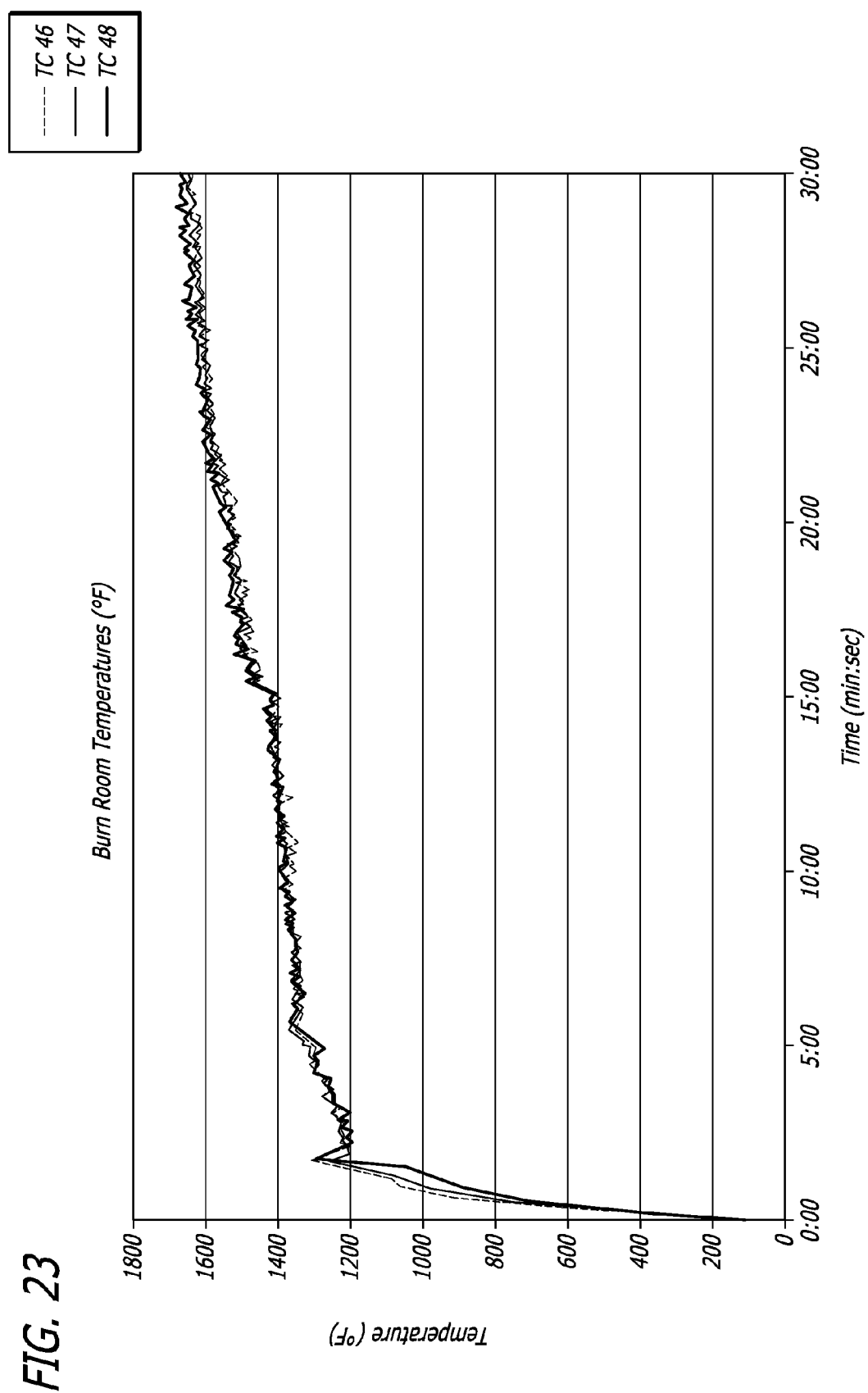
Figure 24:
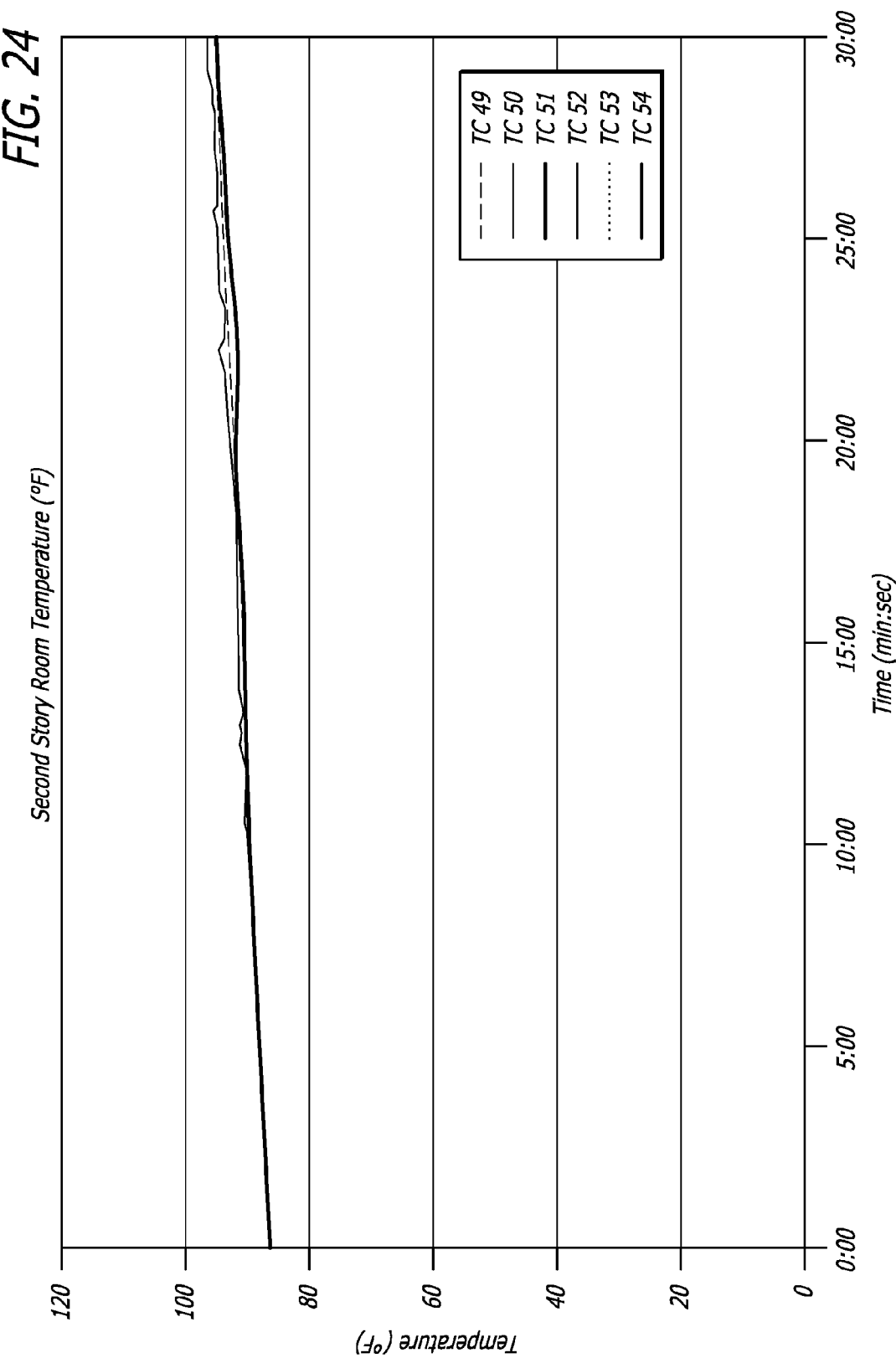
Figure 25:
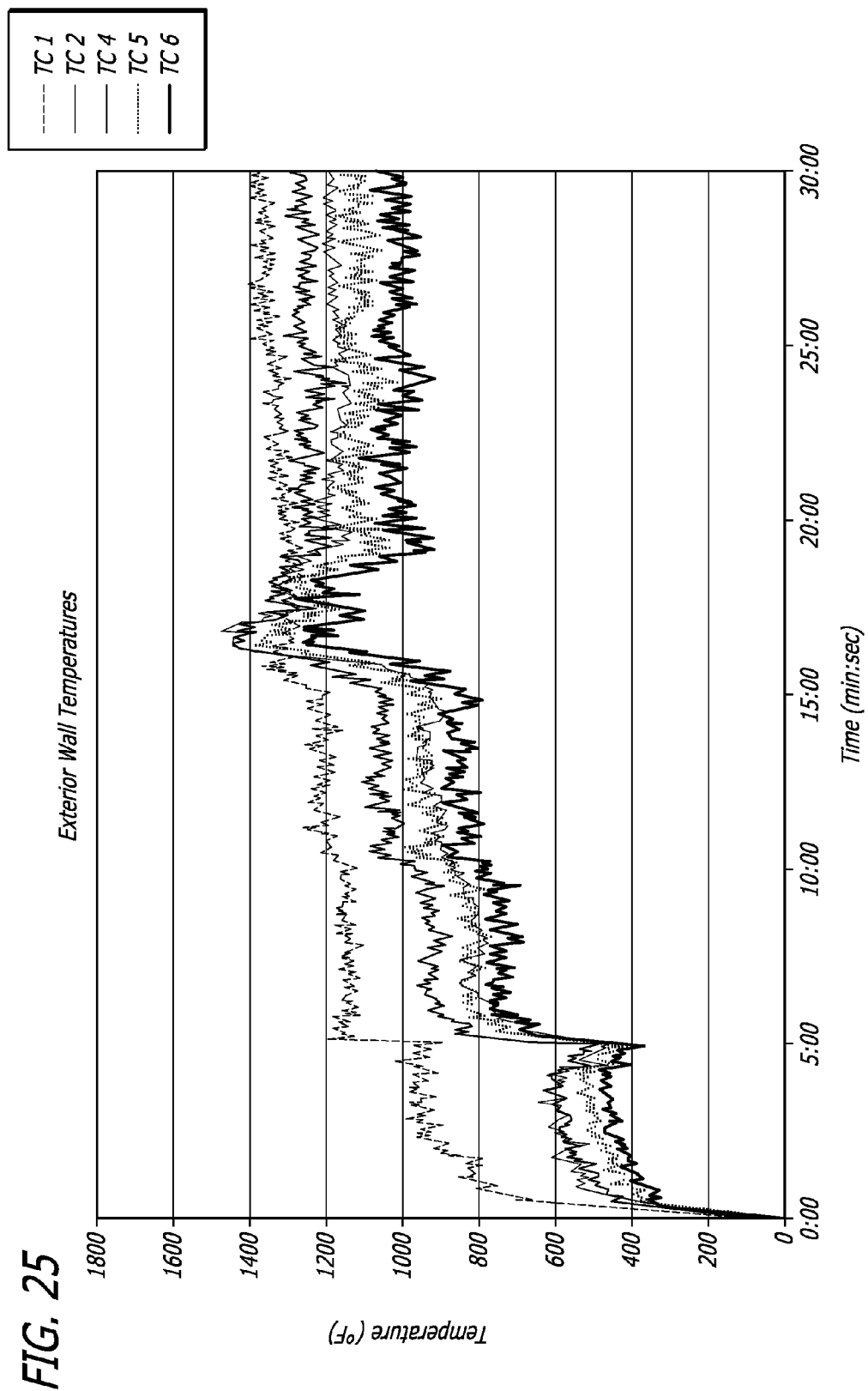
FIGS. 25-35 illustrate the temperature data per time for another NFPA 285 Test performed on exemplary moldable fire resistant composite panels.
Figure 26:
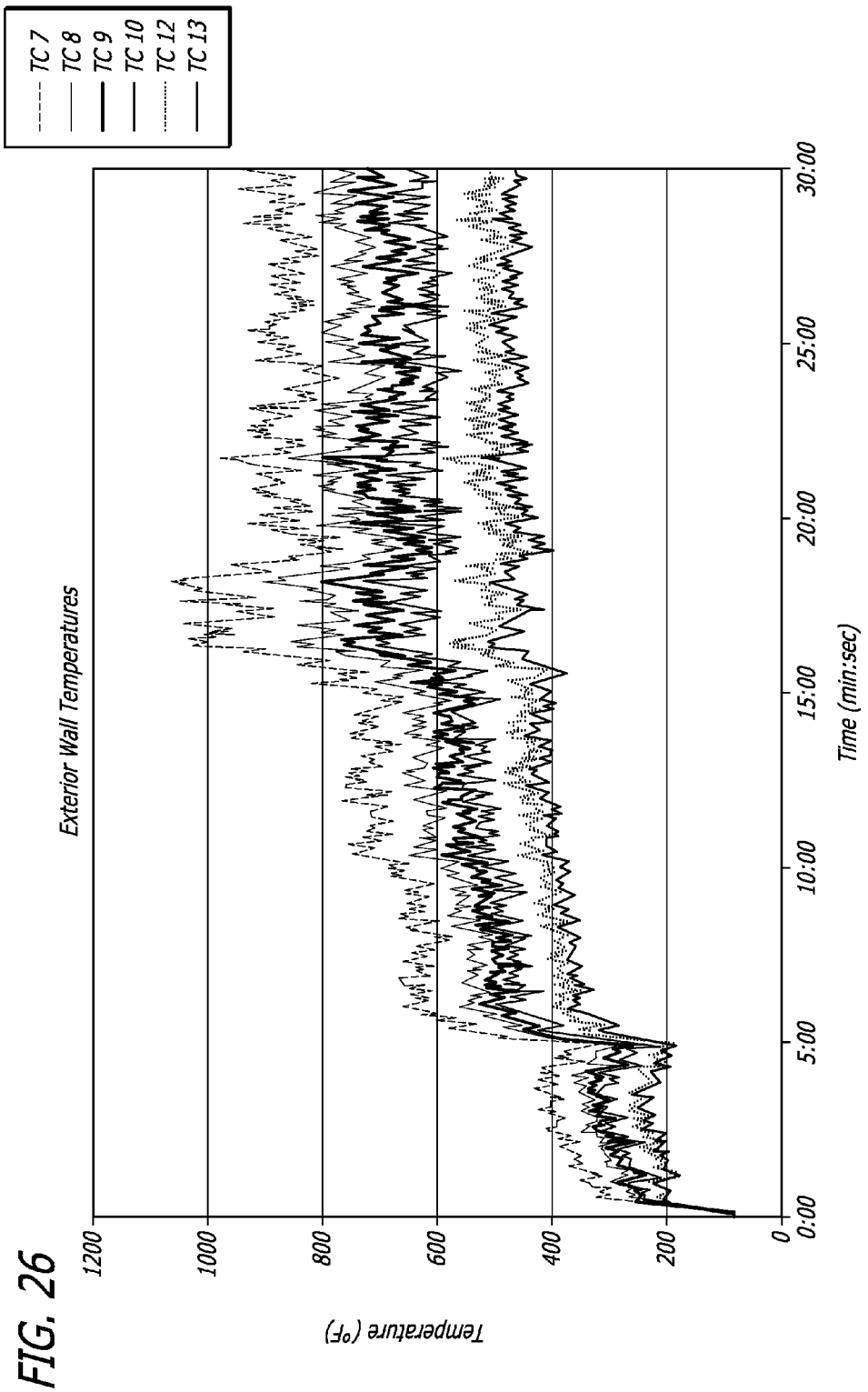
Figure 27:
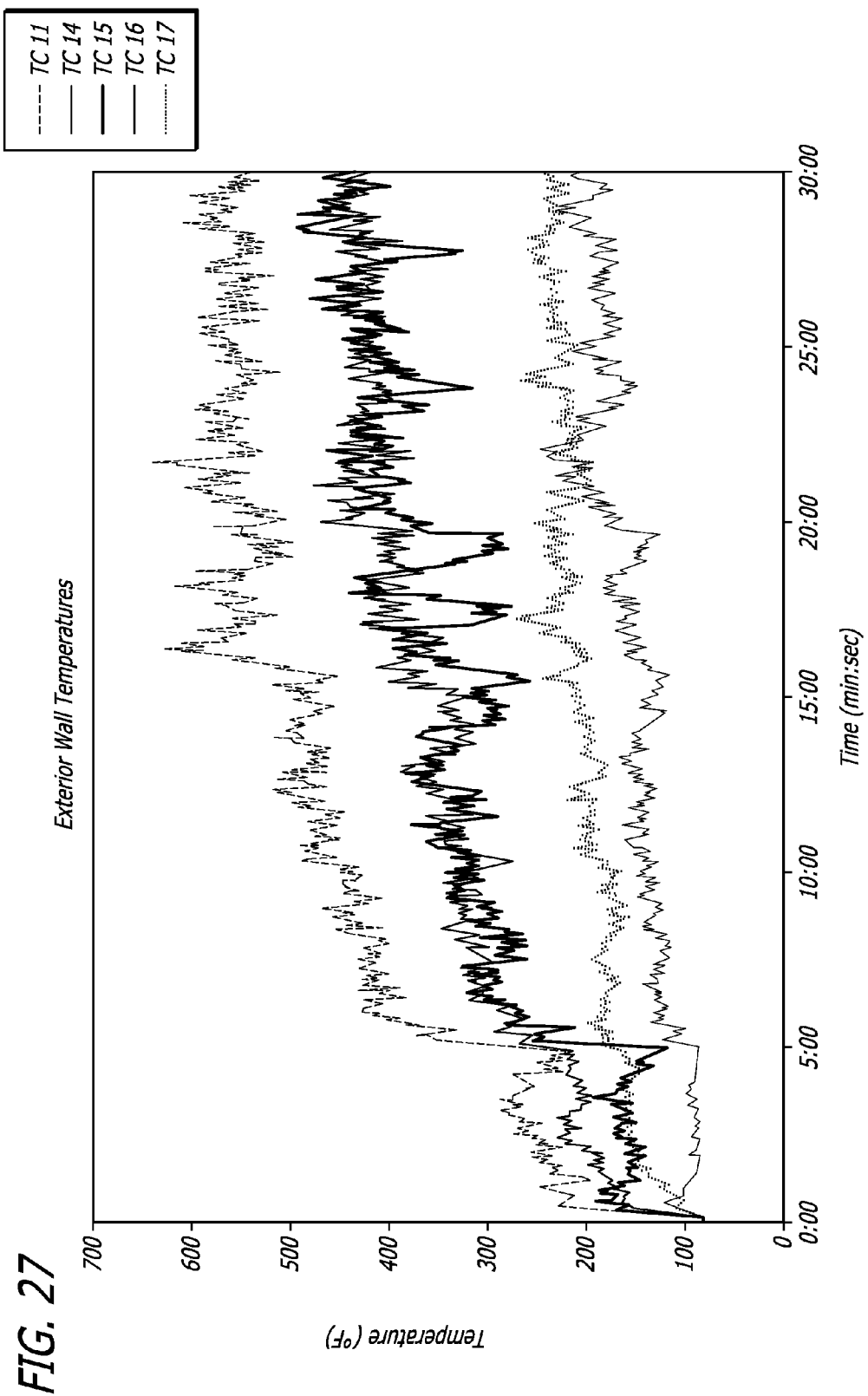
Figure 28:
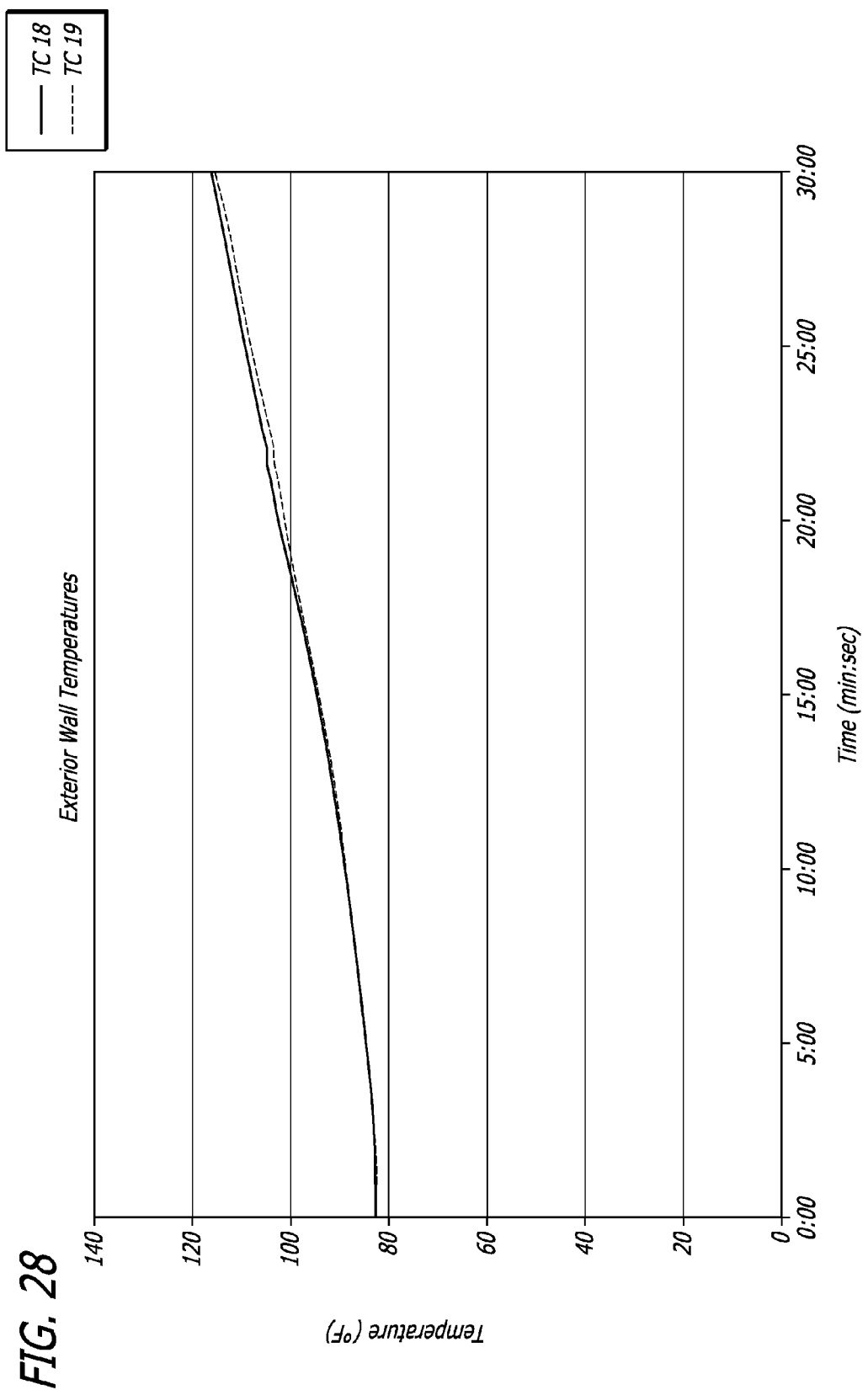
Figure 29:
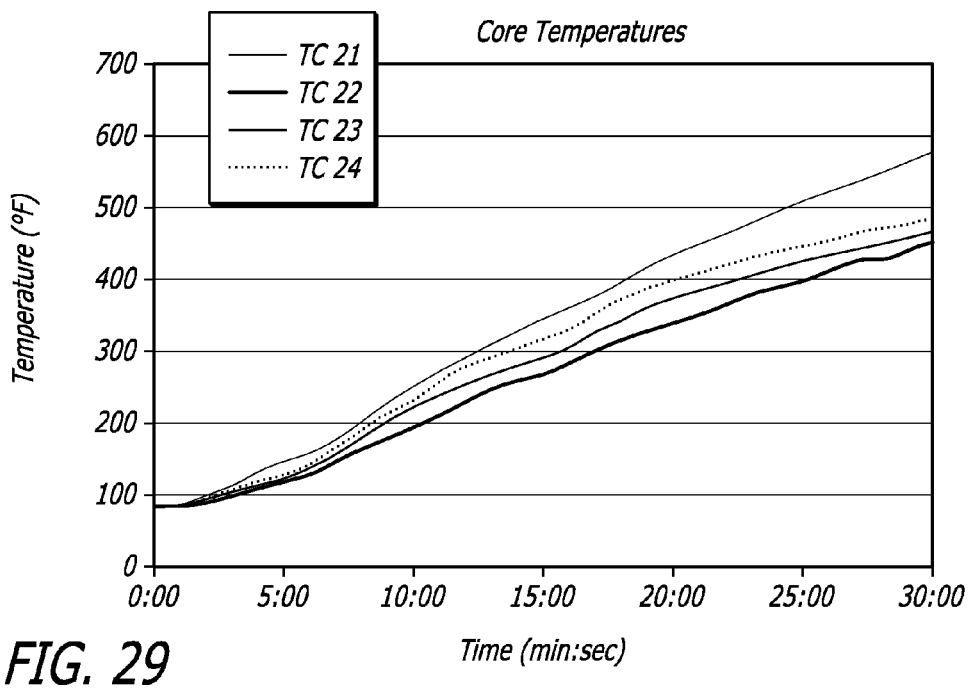
Figure 30:
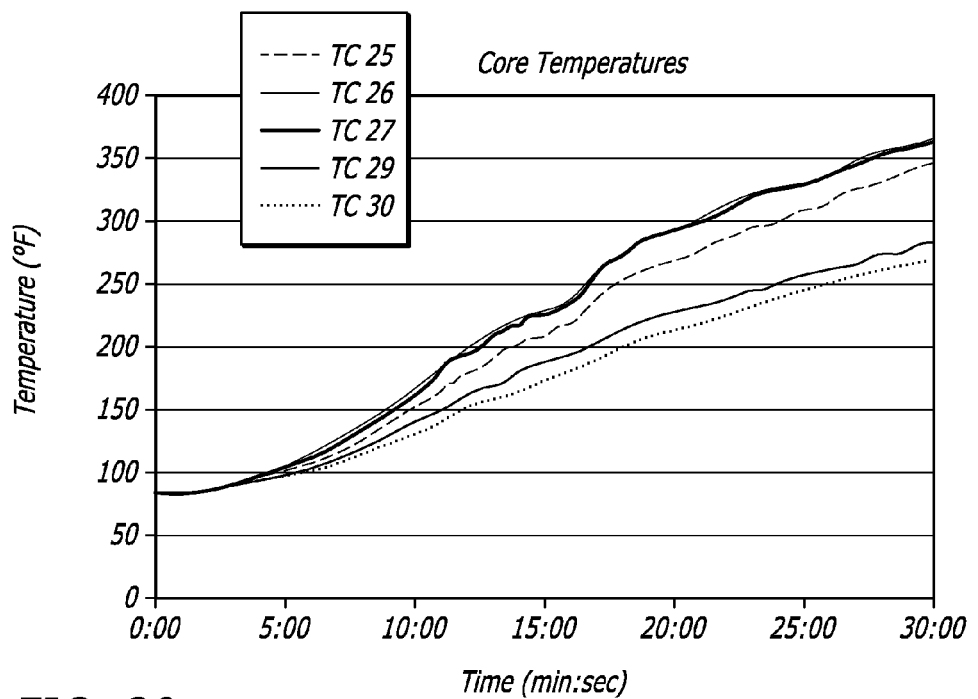
Figure 31:
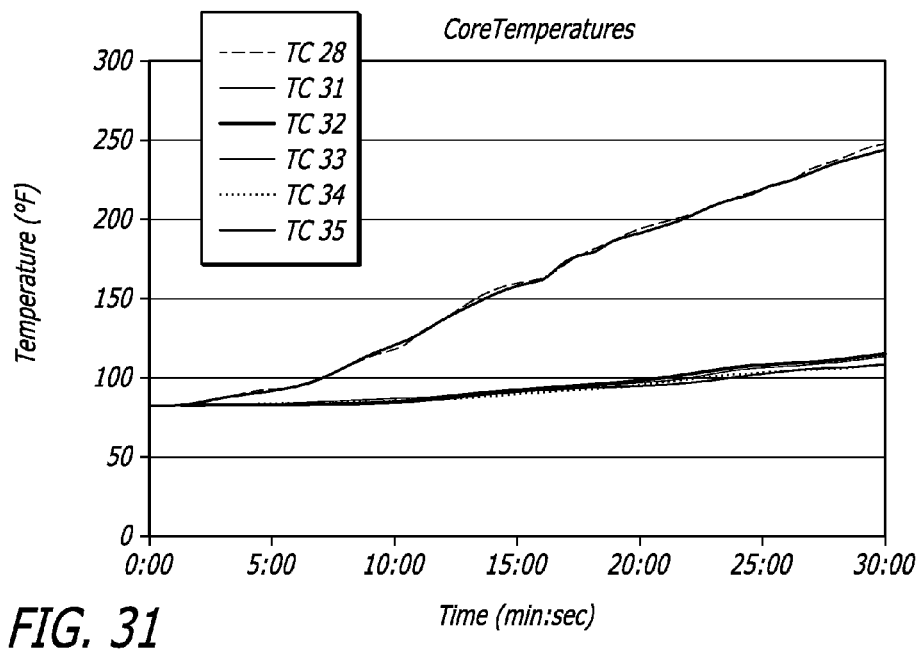
Figure 32:
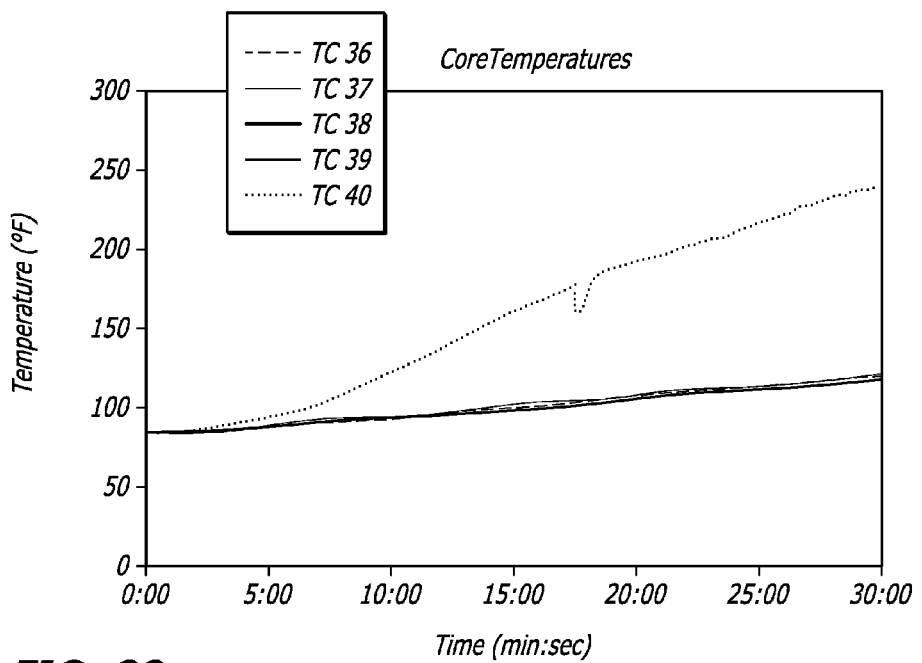
Figure 33:
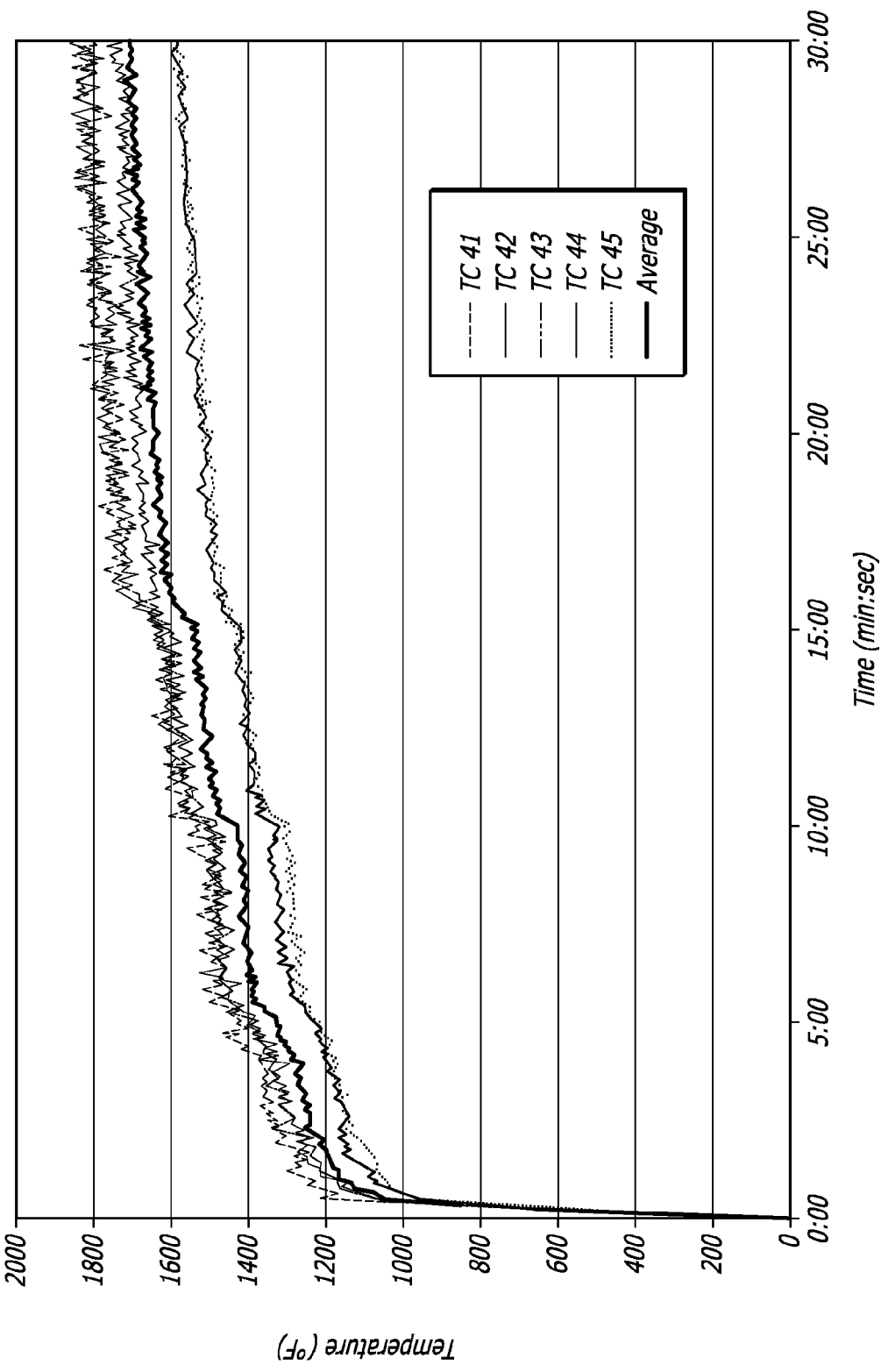
Figure 34:
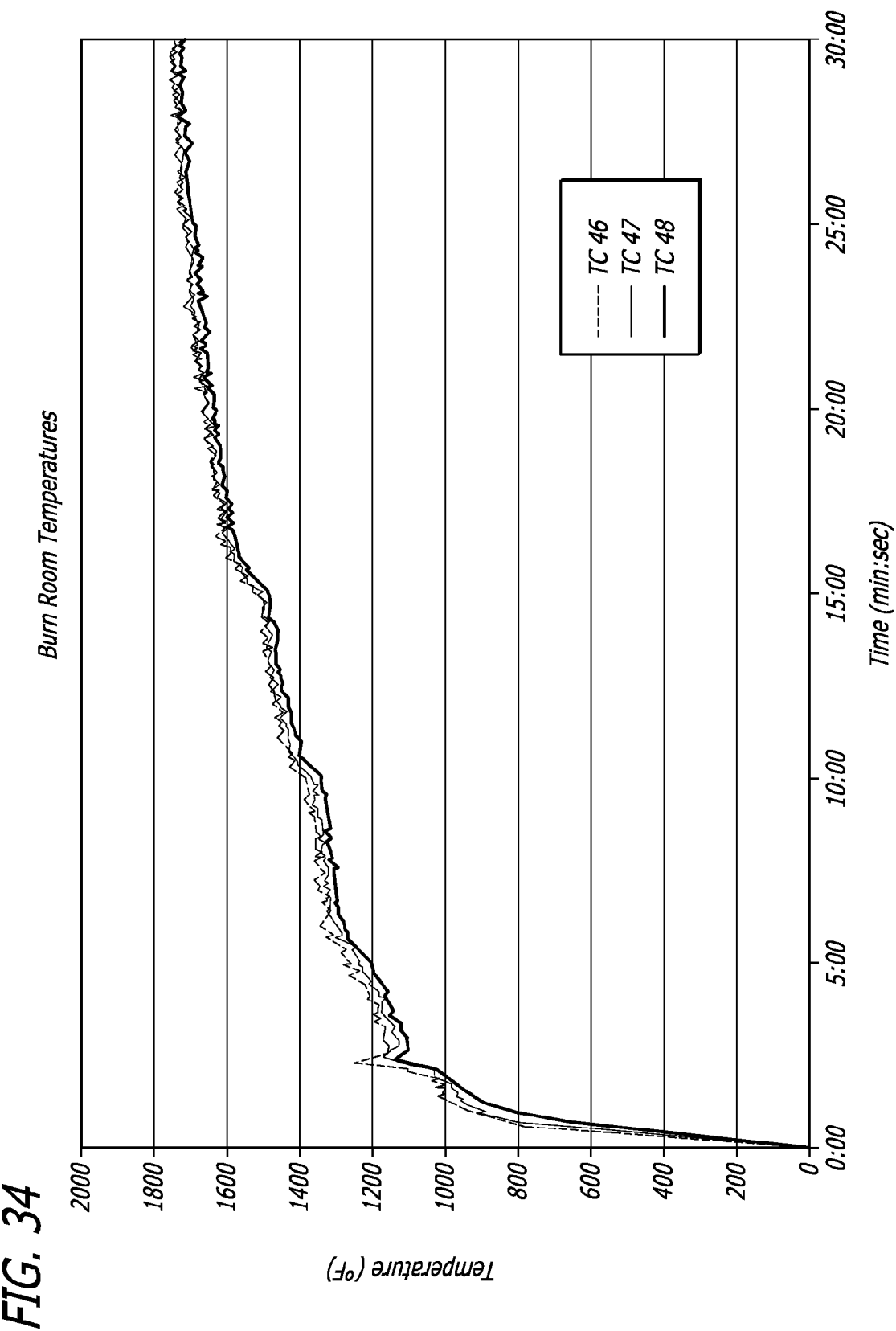
Figure 35:
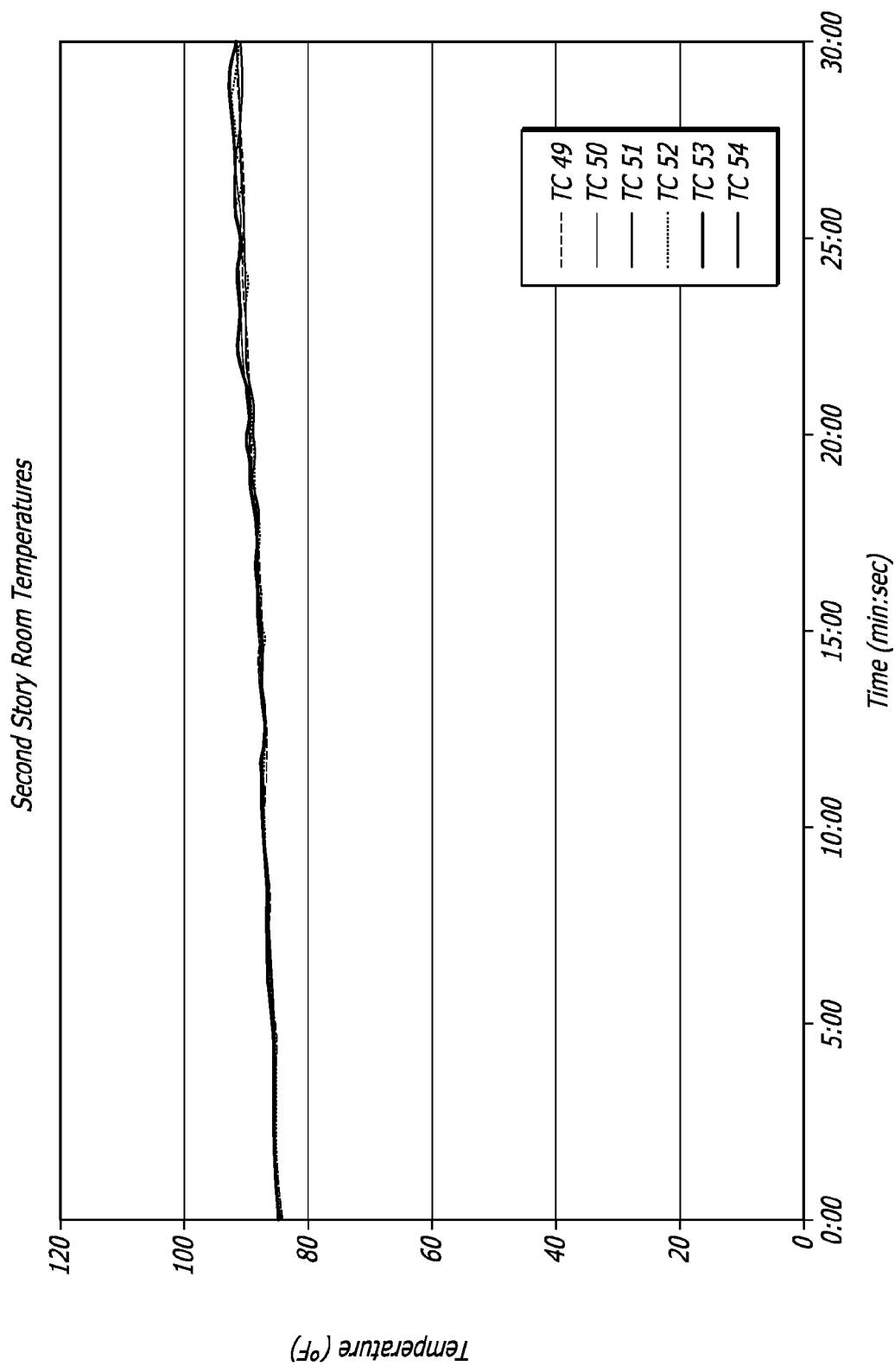

FIG. 4 illustrates a process flow diagram of an exemplary process for manufacturing a moldable fire resistant composite according to one embodiment. At step 401, a fire resistant composite mold is fabricated using computer aided manufacturing processes and tools, such as a computer automated milling machine.

At step 402, a base resin coat or layer is created by mixing an intumescent resin or gel coat, a hardening catalyst (e.g., MEKP) and a heat dissipating component, such as those described in this specification. The heat-dissipating component in the base resin layer can be any heat dissipating material including, but not limited to sand, dried silica, anhydrous silica dioxide ($SO_2$), gravel, rock, clay, ceramic, porous cement, polymer or other heat or fire dissipating component capable of increasing the surface area and/or decreasing the heat transfer across the moldable fire resistant composite.

In an exemplary embodiment, the heat dissipating component is kiln dried silica sand and the weight ratio of intumescent resin to sand is 100 parts intumescent resin per 100 parts sand.

The base resin layer is applied or sprayed onto an inside surface of the fire resistant composite mold with a brush, spray gun or other tool capable of applying the base resin coat to a surface of the fire resistant composite mold. One or more layers of base resin can be applied to a surface of the fire resistant composite mold to create a base resin layer having any thickness. In an exemplary embodiment, $1/8^{th}$ of an inch of base resin is applied to a surface of the fire resistant composite mold.

The base resin can be partially or fully cured at room temperature for a period of time. In an exemplary embodiment, the base resin is allowed to cure at room temperature for a period of time sufficient to achieve suitable crosslinking and hardening of the resin. The base resin can also be cured at a temperature above room temperature.

At step 403, an adhesive layer is applied or sprayed onto the base resin layer prior to or after the base resin layer cures. The adhesive layer can be applied with a brush, spray gun or other tool such as, vacuum applied pressure or a press capable of applying the adhesive layer to a surface of the base resin layer. The adhesive layer can include an adhesive capable of adhering layers of the moldable fire resistant composite including, but not limited to the intumescent resins, the reinforced resins or other heat and fire resistant adhesives described in this specification. Other heat and fire resistant adhesives can include, but are not limited to cement adhesives including polymer adhesives, such as acrylic resins, epoxy resins, rubber resins or combinations thereof. The adhesive layer can comprise the same or a different intumescent resin used in the base resin layer. One or more layers of adhesive can be applied to a surface of the base resin layer to create an adhesive layer having any thickness.

In an exemplary embodiment, the adhesive layer can be an additional smooth layer of intumescent resin applied to the base resin layer to create a suitable adhesive interface between a base resin layer and a reinforced resin layer.

At step 404, a halogenated resin mixture is created by mixing a halogenated unsaturated polyester resin, alumina trihydrate (ATH) and a hardening catalyst, such as methyl ethyl ketone peroxide (MEKP). The halogenated resin mixture is applied to layers of a reinforcing structure. The reinforcing structure can include, glass, fiber, fiber glass, carbon fiber, cloth, oriented strand cloth, chopped strand mat, paper, ceramic, metal, cement, fire-resistant polymer or other reinforcing structure capable of being incorporated into the resin to create a reinforced resin layer. The reinforcing structure can also be treated or made from flame resistant or smoke suppressant materials. One or more layers of halogenated resin mixture can be applied to a surface of the reinforcing structure to create a halogenated resin layer having any thickness. The halogenated resin mixture can be applied to the reinforcing structure with industrial rollers for impregnating or injecting the halogenated resin mixture into the reinforcing structure to create a reinforced resin layer. The reinforced resin layer can be rolled onto PVC piping or other suitable spindle for transportation.

At step 405, the reinforced resin layer is applied to the adhesive layer by hand, with compacting tools or other tool, such as vacuum pressure or a press capable of applying the reinforced resin layer to a surface of the adhesive layer. One or more reinforced resin layers can be applied to a surface of the adhesive layer to create a reinforced resin layer having any thickness. Sufficient layers of reinforced resin can be applied to achieve the desired laminate strength. The number, size and shape of reinforced resin layers can be modified to accommodate any product specification or architectural design including size, shape or weight requirements of the finished fire resistant composite. The reinforced resin layer and the adhesive layer are permitted to cure or dry at room temperature for a period of time to create a hardened, structurally reinforced plastic.

In an exemplary embodiment, the reinforced resin layer and the adhesive layer is allowed to cure or dry cure until sufficient crosslinking occurs to achieve the desired laminate strength. The reinforced resin layer and the adhesive layer can also be cured at a temperature above room temperature.

Alternatively, the reinforced resin layer can be directly applied to a surface of the base resin layer within the mold without an adhesive layer in between. The reinforced resin layer can be applied before or after the base resin partially or fully cures into a hardened state.

At step 406, the contents of the mold are cured. A metal (e.g., aluminum) or other frame is embedded into the layers of base resin, adhesive and reinforced resin within the mold. The mold and its contents can be placed in an oven for post curing at a predetermined temperature for a predetermined time to create a cured fire resistant composite part within the mold.

In an exemplary embodiment, the mold and its contents are post cured in an oven at a temperature of 150° C. until sufficient crosslinking of the resins occur.

At step 407, the cured fire resistant composite is removed from the mold.

At step 408 a portion of the base resin coat or layer is removed to expose the heat-dissipating component on a surface of the fire resistant composite part. A portion of the base resin layer can be removed by sand blasting the layer to expose at least a portion of the heat-dissipating component, such as sand in the base resin layer. The exposed heat-dissipating component within the base resin layer of the fire resistant composite imparts fire resistant and smoke suppressant properties that further reduce flame and smoke spread when the fire resistant composite is exposed to fire or heat.

The process for manufacturing moldable fire resistant composites including the steps illustrated in FIG. 4 can be performed in any order and additional processing steps can be included. For instance, one or more layers or combination of layers of the moldable fire resistant composite can be adhered to another layer in any order. The moldable fire resistant composite can also be polished, sanded, or painted with any material to apply a surface finish to any layer of the moldable fire resistant composite. The process for manufacturing moldable fire resistant composites disclosed in this specification can be used to shape and mold any fire resistant composite part to accommodate specific geometries, product specifications and architectural designs.

In an exemplary embodiment, the process steps outlined in FIG. 4 are used to create an exterior panel for a building or high-rise.

EXAMPLES

The following examples are provided to illustrate exemplary formulations of moldable fire resistant composites and processes for manufacturing moldable fire resistant composites. The examples are not intended to limit the scope of the present disclosure. Various formulations throughout the examples when used in combination or independently have been found to impart specific fire, flame and smoke resistant properties to the final moldable fire resistant composite. The compositions and weight ratios of each component part of a composite layer described in the examples can be modified to meet material or product specifications.

Example 1

A reinforced resin layer was manufactured with the components outlined in Table 1.

TABLE 1

Reinforced Resin Layer

| Material | I.D. (Specification) | Supplier |
|---|---|---|
| Resin | Norsodyne H 81269 TF | CCP |
| Accelerator | 6% cobalt | |
| Initiator | Luperox ® DDM-9 | Arkema |
| Initiator | Hi-Point ® PD-1 | Pargan Marshall |
| Fiberglass | Chopped strand mat | Metyx |

The reinforced resin layer of Example 1 is composed of a reinforcing resin mixture of the resin Norsodyne H 81269 TF, an accelerator containing 6% cobalt and the initiators Luperox® DDM-9 and Hi-Point® PD-1. The reinforcing resin mixture is applied to chopped strand mat fiberglass to form a reinforced resin layer. The reinforced resin layer was cured at room temperature and post cured at elevated temperature. The percent by weight composition of each component of the reinforced resin layer based on weight of resin of Example 1 is outlined in Table 2.

TABLE 2

Reinforced Resin Layer Weight Composition

| Material | Amount by Weight |
|---|---|
| Resin | As Required |
| Accelerator | 0.15%-0.24% of resin by weight |
| Initiators | 0.9%-2.4% of resin by weight |
| Fiberglass | At least 41% of resin by weight |

Example 2

A reinforced resin layer was manufactured with the components outlined in Table 3.

TABLE 3

Reinforced Resin Layer

| Material | I.D. (Specification) | Supplier |
|---|---|---|
| Resin | Hetron ® 650 | Ashland |
| Synergist | APE 3040 | Nyacol |
| Engineered Filler | MX100 ATH | RJ Marshall |
| Initiator | Luperox ® DDM-9 | Arkema |
| Initiator | Hi-Point ® PD-1 | Pargan Marshall |
| Fiberglass | Oriented strand cloth | Metyx |

The reinforced resin layer of Example 2 is composed of a reinforcing resin mixture of the resin Hetron® 650, the synergist APE 3040 and the initiators Luperox® DDM-9 and Hi-Point® PD-1. The reinforcing resin mixture is applied to oriented strand cloth fiberglass to form a reinforced resin layer. The reinforced resin layer was cured at room temperature and post cured at elevated temperature. The percent by weight composition of each component of the reinforced resin layer based on weight of resin of Example 2 is outlined in Table 4.

TABLE 4

Reinforced Resin Layer Weight Composition

| Material | Amount by Weight |
|---|---|
| Resin | As Required |
| Synergist | 3-8% of resin by weight |
| Engineered Filler | 100% of resin by weight |
| Initiators | 0.9%-2.4% of resin by weight |
| Fiberglass | At least 41% of resin by weight |

Example 3

A base resin layer was manufactured with the components outlined in Table 5.

TABLE 5

Base Resin Layer

| Material | I.D. (Specification) | Supplier |
|---|---|---|
| Resin | Norsodyne H 81269 TF | CCP |
| Accelerator | 6% cobalt | |
| Initiator | Luperox ® DDM-9 | Arkema |
| Initiator | Hi-Point ® PD-1 | Pargan Marshall |
| Engineered Filler | A204 3-5 micron ATH | R J Marshall |
| Sand | Lapis Lustre #0/30 | Cemex |
| Sand | Lapis Lustre #2/16 | Cemex |

The base resin layer of Example 3 is composed of a mixture of the resin Norsodyne H 81269 TF, the accelerator containing 6% cobalt, the initiators Luperox® DDM-9 and Hi-Point® PD-1 and kiln dried sands Lapis Lustre #0/30 and Lapis Lustre #2/16. A pigment can be added to the base resin layer for coloring. The base resin layer was cured at room temperature and post cured at elevated temperature. The percent by weight composition of each component based on weight of resin of Example 3 is outlined in Table 6.

TABLE 6

Base Resin Layer Weight Composition

| Material | Amount by Weight |
|---|---|
| Resin | As Required |
| Accelerator | 0.15%-0.24% of resin by weight |
| Engineered Filler | At least 10% of resin by weight |

TABLE 6-continued

Base Resin Layer Weight Composition

| Material | Amount by Weight |
| --- | --- |
| Initiators | 0.9%-2.4% of resin by weight |
| Sands | At least 100% of resin by weight |
| Pigment | Up to 2% of resin by weight |

Example 4

A base resin layer was manufactured with the components outlined in Table 7.

TABLE 7

Base Resin Layer

| Material | I.D. (Specification) | Supplier |
| --- | --- | --- |
| Gel Coat | Fireblock ™ 2330PAWK745 | CCP |
| Accelerator | 6% cobalt | |
| Initiator | Luperox ® DDM-9 | Arkema |
| Initiator | Hi-Point ® PD-1 | Pargan Marshall |
| Sand | Lapis Lustre #0/30 | Cemex |
| Sand | Lapis Lustre #2/16 | Cemex |

The base resin layer of Example 4 is composed of the resin Fireblock™ 2330 PAWK745, an accelerator containing 6% cobalt, the initiators Luperox® DDM-9 and Hi-Point® PD-1 and kiln dried sands Lapis Lustre #0/30 and Lapis Lustre #2/16. A pigment can be added to the base resin layer for coloring. The base resin layer was cured at room temperature and post cured at elevated temperature. The percent by weight composition of each component based on weight of resin in Example 4 is outlined in Table 8.

TABLE 8

Base Resin Layer Composition

| Material | Amount by Weight |
| --- | --- |
| Resin | As Required |
| Accelerator | 0.15%-0.24% of resin by weight |
| Engineered Filler | At least 10% of resin by weight |
| Initiators | 0.9%-2.4% of resin by weight |
| Sands | At least 100% of resin by weight |
| Pigment | Up to 2% of resin by weight |

Example 5

A moldable fire resistant composite including a base resin layer; an adhesive layer; and a reinforced resin layer was manufactured according to the process described in FIG. 4 using the reinforced resin layer of Example 1 and the base resin layer of Example 3. The base resin layer was placed in a mold of an exterior building panel. An adhesive composed of the resin Norsodyne H 81269 TF was applied to the base resin layer in the mold. The reinforced resin layer was applied on top of the adhesive layer to adhere the base resin layer to the reinforced resin layer. The base resin layer and the reinforced resin layer can be attached prior to or after some curing occurs to either layer. The composite layers were cured at room temperature and post cured in an oven to assure adequate crosslinking of the resins. The resulting composite exterior building panel was removed from the mold and the base resin layer was sand-blasted to remove a layer of the base resin and expose the heat-dissipating sand component on a surface of the moldable fire resistant composite panel. The moldable fire resistant composite panel can be further processed for surface finishing, coloring or shaping. The base resin layer of Example 5 exhibits superior smoke suppressant properties and the reinforced resin layer exhibits superior flame retardant properties. The various layers of the moldable fire resistant composite can be designed to suppress smoke, flames or both depending on the specific application of the composite part.

Example 6

A moldable fire resistant composite including a base resin layer; an adhesive layer; and a reinforced resin layer was manufactured according to the process described in FIG. 4 using the reinforced resin layer of Example 2 and the base resin layer of Example 4. The base resin layer was placed in a mold of an exterior building panel. An adhesive composed of the resin Fireblock™ 2330PAWK745 was applied to the base resin layer in the mold. The reinforced resin layer was applied to the top of the adhesive layer to adhere the base resin layer to the reinforced layer. The base resin layer and the reinforced resin layer can be attached prior to or after some curing occurs to either layer. The composite layers were cured at room temperature and post cured in an oven to assure adequate crosslinking of the resins. The resulting composite exterior building panel was removed from the mold and the base resin layer was sand-blasted to remove a layer of the base resin and expose the heat-dissipating sand component on a surface of the moldable fire resistant composite panel. The moldable fire resistant composite panel can be further processed for surface finishing, coloring or shaping. The base resin layer of Example 6 exhibits superior smoke suppressant properties and the reinforced layer exhibits superior flame retardant properties. The various layers of the moldable fire resistant composite can be designed to suppress smoke, flames or both depending on the specific application of the composite part.

ASTM E84-10 Flame and Smoke Spread Tests

The moldable fire resistant composites of Examples 1, 5 and 6 were tested as described in the ASTM E84-10 X3. Guide to Handling Multiple Test Data. The testing included standard flame and smoke density developed classification tests in accordance with the ASTM Designation E84-10 "Standard Method of Test for Surface Burning Characteristics of Building Materials." In order to obtain the Flame Spread Classification, the results of the test should be compared to Table 9.

TABLE 9

ASTM E84-10 Flame Spread Classification

| NPA Class | IBC Class | Flame Spread | Smoke Developed |
| --- | --- | --- | --- |
| A | A | 0 to 25 | Less than or equal to 450 |
| B | B | 26 to 75 | Less than or equal to 450 |
| C | C | 76 to 200 | Less than or equal to 450 |

ASTM E84-10 Test 1

ASTM E84-10 Test 1 was performed on the moldable fire resistant composite of Example 5. Three samples of the moldable fire resistant composite of Example 5 were tested. The ignition occurred in 2 minutes and 33 seconds. The flame front was a maximum of 7 feet. The time to maximum spread was 8 minutes and 2 seconds. The test duration was 10 minutes. The ASTM E84-10 test results of Example 5 are provided in Table 10.

TABLE 10

| ASTM E84-10 Test 1 | | |
| --- | --- | --- |
| Material | Flame Spread | Smoke Developed |
| Set No. 1 | 25 | 250 |
| Set No. 2 | 20 | 250 |
| Set No. 3 | 20 | 250 |

FIGS. 5A-7B illustrate the flame spread and smoke developed per time for sets 1-3 of Example 5 for ASTM E84-10 Test 1.

ASTM E84-10 Test 2

ASTM E84-10 Test 2 was performed on the reinforced resin layer of Example 1. Three samples of the reinforced resin layers were tested. The ignition occurred in 2 minutes and 25 seconds. The flame front was a maximum of 7 feet. The time to maximum spread was 9 minutes and 41 seconds. The test duration was 10 minutes. The ASTM E84-10 test results of Example 1 are provided in Table 11.

TABLE 11

| ASTM E84-10 Test 2 | | |
| --- | --- | --- |
| Material | Flame Spread | Smoke Developed |
| Set No. 1 | 15 | 250 |
| Set No. 2 | 25 | 250 |
| Set No. 3 | 20 | 250 |

FIGS. 8A-10B illustrate the flame spread and smoke developed per time for sets 1-3 of Example 1 for ASTM E84-10 Test 2.

ASTM E84-10 Test 3

ASTM E84-10 Test 3 was performed on the moldable fire resistant composite of Example 6. Three samples of the moldable fire resistant composite of Example 6 were tested. The ignition occurred in 2 minutes and 23 seconds. The flame front was a maximum of 5 feet. The time to maximum spread was 4 minutes and 24 seconds. The test duration was 10 minutes. The ASTM E84-10 test results of Example 6 are provided in Table 12.

TABLE 12

| ASTM E84-10 Test 3 | | |
| --- | --- | --- |
| Material | Flame Spread | Smoke Developed |
| Set No. 1 | 20 | 350 |
| Set No. 2 | 15 | 350 |
| Set No. 3 | 10 | 350 |

FIGS. 11A-13B illustrate the flame spread and smoke developed per time for sets 1-3 of Example 6 for ASTM E84-10 Test 3.

NFPA 285 Tests

The moldable fire resistant composites of Example 6 underwent the NFPA 285 test, 2012 Edition, "Standard Fire Test Method for Evaluation of Fire Propagation Characteristics of Exterior Non-Load Bearing Wall Assemblies Containing Combustible Components." The wall assemblies in NFPA 285 Tests 1 and 2 below met the acceptance criteria stated in the standard. NFPA 285 provides a method of determining the flammability characteristics of exterior, non-load bearing wall assemblies, which contain combustible components. The test method is intended to simulate the "full-scale" fire performance of the wall assembly being evaluated. The following performance characteristics are evaluated: (1) Flame propagation over the exterior face of the system, (2) Vertical flame spread within the combustible core components from one story to the next, (3) Vertical flame spread over the interior (room side) surface of the panels from one story to the next, and (4) Lateral flame spread from the compartment of fire origin to adjacent spaces.

NFPA 285 Test 1

The moldable fire resistant composite panels were made according to Example 6. Each panel underwent the NFPA 285 testing. The moldable fire resistant composite panels were a nominal 7/16-in. thick panel, consisting of a 3/16-in. thick base resin layer and a 1/4-in. thick reinforced resin layer. The panels included preformed returns, integral steel perimeter framing, and a 1-in. thick mineral wool layer bonded to the back face of the panels within the return. The panels were an off-white color and had a nominal density of 125 lb/ft$^3$. A base wall assembly consisted of 20-ga, 3⅝-in., C-channel steel studs framed vertically 24 in. on center. Stud sections were included horizontally in between the vertical studs located nominally at the 11 ft 6-in. elevation, at the 5-ft elevation (in line with the window header framing), and 5 in. below the window sill. The interior face of the wall was sheathed with ⅝-in. Type "X" gypsum wallboard. The interior face gypsum joints were finished with 2-in. tape and treated with joint compound compliant to ASTM C 475, Standard Specification for Joint Compound and Joint Tape for Finishing Gypsum Board. The base wall assembly included 4-in. thick, 4-pcf, mineral wool safing placed within the stud cavity at each floor line and was held in place by "Z" clips. The mineral wool insulation was installed in multiple layers to cover the full thickness of the floor lines, which were nominally 8 in. thick. The exterior surface of the base wall was sheathed with ½-in. thick Densglass® Gold sheathing.

Following the completion of the base wall, 3×3×⅛-in. structural steel tubes were installed vertically over the exterior face of the wall. The vertical steel tubes were secured to the wall with 3-in. wide, 16-ga steel straps, which conformed to the face of the steel tube and tied back to the horizontal studs with a total of 4 fasteners per strap. The steel tubes were also tied back to the test frame at the top of each steel tube by welding 2×¼-in. flat stock to the top of each tube, extending back to and welded to the test frame. A horizontal steel tube section was positioned nominally 2¾ in. above the window header to act as a base for the vertical steel tubes which were located above the window opening. The horizontal steel tube was supported by 3×3×¼-in. angle clips bolted to a piece of flat stock which was welded to the underside of the horizontal tube. The supporting angle clips were secured to the vertical steel tubes that ran to the sides of the window opening. All vertical steel tubes included brackets which came off the front face of the tube and acted as hangers for the moldable fire resistant composite panels. The hangers consisted of 2×3×⅛-in. tubes protruding off the front face of the tube with a 3×3×¼-in. angle sitting on top surface of the protrusion.

Upon completion of the steel tube installation, 4-in. thick mineral wool insulation was installed between all steel tubes covering the full area of the wall except for where the steel tubes were. The mineral wool was installed using bugle head screws with 1½-in. diameter washers. After the installation of the mineral wool, the moldable fire resistant composite panels were lifted into place and were hung from the brackets on the steel tubes. The panels were preformed such that when installed they would have a nominal 1-in. gap between adjacent panels at the front face and a ¼-in. gap between the returns of the panels. The ¼-in. gaps between panel returns were filled with an intumescent gasket identified as "Spec-Seal Series EW285 Firestop Gasket" and were manufactured by STI. The dimensions of the intumescent gasket was ¾×⅜ in. (W×T).

After all the panels were installed, 20-ga galvanized steel flashing was installed on the interior surface of the window opening. The steel flashing was "L" shaped, capping the back edge of the base wall and terminating nominally 1 in. short of the front face of the moldable fire resistant composite panels. The steel flashing on the interior window surfaces was attached only to the steel studs and track with two rows of fasteners spaced nominally 10 in. on center around the perimeter of the window. The test wall assembly was built into a movable frame system that was installed and secured to the test apparatus.

The test conditions were recorded at an ambient temperature of 85.2° F. and a relative humidity of 66.2%. The airflow across the exterior face of the test assembly was less than 4 ft/s as determined by an anemometer placed at right angles to the exterior face. Visual observations made during the test appear in Tables 13 and 14. Flame propagation observations are based on sustained flames on the surface of the wall. Intermittent flaming above the sustained flames is not considered for estimating the extent of flame propagation.

TABLE 13

Test Observations of Front Wall

| Time (min:s) | Observations of Front Wall |
| --- | --- |
| 0 | Start of test. |
| 1:30 | Light smoking from window header. Flashing beginning to sag and deflect. |
| 5:00 | Window burner placed. |
| 6:30 | Discoloration spots are developing in the area of flame impingement above window header. |
| 10:00 | Wall continues to discolor. No attached flaming to wall. |
| 13:00 | Light smoke is beginning to accumulate in lab. No apparent smoking directly from the wall assembly. |
| 16:00 | Visible deflection to panels in area of flame impingement. |
| 17:00 | Flame is beginning to attach to wall assembly. |
| 20:00 | Flaming reaches 11-ft elevation (6 ft above window opening). |
| 23:00 | Flaming has receded to 10-ft elevation (5 ft above window opening). |
| 25:00 | Flaming attached to window jamb near upper corner where it meets window header. |
| 30:00 | Flaming has receded to 9-ft elevation (4 ft above window opening). Test terminated. Start of 10-min observation period. |
| 32:00 | All residual flaming has ceased. No further observations. |

TABLE 14

Test Observations of Second-Floor Room

| Time (min:s) | Observations of Front Wall |
| --- | --- |
| 0 | Start of test. 100% visibility in second floor room. |
| 10:00 | No visible changes to visibility in second floor room. 100% visibility. |
| 20:00 | Slight reduction to visibility. 90% visibility. |
| 25:00 | Further reduction to visibility. 70% visibility. |
| 30:00 | Further reduction to visibility. 50% visibility. Test terminated. No flaming in second floor room during test period. Start of 10-min observation period. |
| 35:00 | Visibility increasing. 70% visibility. |

Flame Propagation, Exterior Face of Wall Assembly (1). TCs 11 and 14-17 did not exceed 1000° F. at any time during the test; (2). Flames emitting from the surface of the exterior face did not reach a vertical elevation of 10 ft above the top of the window opening at any time during the test; and (3). Flames emitting from the surface of the exterior face did not reach a lateral distance of 5 ft from the vertical centerline of the window opening any time during the test.

Flame Propagation, Core Components

The temperatures in the air cavity behind the panels as measured by TCs 28 and 31-40 did not exceed 1000° F. at any time during the test.

Flame Propagation, Beyond First-Story Test Room (1). Flames did not occur over the surface of the exterior face beyond the concrete block walls or beyond the intersection of the test wall assembly, and the concrete block fixture walls. (2). Lateral temperatures of the air cavity, as measured by TCs 18 and 19, did not exceed 1000° F. at any time during the test.

Temperatures in Second-Story Test Room

Temperatures 1 in. from the interior surface of the wall assembly within the second floor test room, as measured by TCs 49-54, did not exceed 500° F. above the ambient temperature at any time during the test.

Flames in Second-Story Test Room

Review of the pertinent TC data, second-floor videotape, and post-test inspection indicated that flame propagation did not occur in the second floor at any time during the test. The panels met acceptance criteria as stated in the NFPA 285 Standard.

FIGS. 14-24 illustrate the temperature data per time for NFPA 285 Test 1.

NFPA 285 Test 2

The moldable fire resistant composite panels were made according to Example 6. Each panel underwent the NFPA 285 testing. The moldable fire resistant composite panels were a nominal 0.18-in. thick panel. The panels included preformed returns, integral aluminum perimeter framing. The panels were an off-white color and had a nominal density of 125 lb/ft$^3$. The moldable fire resistant composite panels consisted of ¼-in thick aluminum blades which connect to the interior perimeter of returns of the panel. A base wall assembly was first constructed, consisting of 20-ga, 3⅝-in, C-channel steel studs framed such that a stud was located 8-in from each vertical edge of each prefabricated panel section and the intermediate studs were located between. The interior face of the wall was sheathed with ⅝-in Type "X" gypsum wallboard. The interior face gypsum joints were finished with 2-in tape and treated with joint compound compliant to ASTM C475, Standard Specification for Joint Compound and Joint Tape for Finishing Gypsum Board. The base wall assembly included 4-in thick, 4-pcf, mineral wool safing placed within the stud cavity at each floor line and was held in place by "Z" clips. The mineral wool insulation was installed in multiple layers to cover the full thickness of the flow line, which were nominally 8 in thick. No sheathing was installed on the exterior surface of the base wall framing.

Steel flashing (20-ga galvanized steel) was installed on the interior surface of the window opening such that it capped the interior sheetrock surface of the assembly and terminated 1-in short of the front face of the assembly. The overall assembly depth, including the sheetrock and base wall framing was nominally 22-in deep. The steel flashing on the interior window surfaces was attached only to the aluminum framing with a single row of fasteners spaced nominally 10-in on the center along the window opening header and sill and three screws equally spaced over the height of the jambs. The test wall assembly was built into a movable frame system that was installed and secured to the test apparatus.

The test conditions were recorded at an ambient temperature of 81.0° F. and a relative humidity of 72%. The airflow across the exterior face of the test assembly was less than 4 ft/s as determined by an anemometer placed at right angles to the exterior face. Visual observations made during the test appear in Tables 15 and 16. Flame propagation observations are based on sustained flames on the surface of the wall. Intermittent flaming above the sustained flames is not considered for estimating the extent of flame propagation.

TABLE 15

Test Observations of Front Wall

| Time (min:s) | Observations of Front Wall |
|---|---|
| 0 | Start of test. |
| 2:30 | Light smoking from gap between window header flashing and bottom edge of panel above window opening. |
| 5:00 | Window burner applied to exterior of surface of wall assembly. |
| 7:11 | No visible discoloration to exterior of surface of wall assembly. |
| 10:00 | Light discoloration of panel exterior immediately above window header. |
| 13:00 | Blistering on exterior surface of panel in area of direct flame impingement. |
| 16:00 | Flame contribution from panel material beginning to take place. Flaming to approximately from 4 ft above window opening header. |
| 17:30 | Flaming from panel material has subsided. Flaming from exterior of wall assembly appears to be from all from window burner. |
| 21:00 | Burning at window header has subsided. |
| 27:15 | Brief flashes of flame on horizontal joint between first and second panel above window opening. Flashes of flame are to the left of the centerline. |
| 30:00 | Test Terminated. |
| Post-Test | No residual flaming following extinguishment of test burners. |

TABLE 16

Test Observations of Second-Floor Room

| Time (min:s) | Observations of Front Wall |
|---|---|
| 0 | Start of test. Visibility in observation room 100%. |
| 10:00 | No smoking present in observation room. Visibility remains 100%. |
| 20:00 | No smoking present in observation room. Visibility remains 100%. |
| 27:00 | Minimal amount of smoke in observation room. Visibility is 95%. |
| 30:00 | Test Terminated. No flaming present in observation room at any point during test. |

Flame Propagation, Exterior Face of Wall Assembly (1). TCs 11 and 14-17 did not exceed 1000° F. at any time during the test; (2). Flames emitting from the surface of the exterior face did not reach a vertical elevation of 10 ft above the top of the window opening at any time during the test; and (3). Flames emitting from the surface of the exterior face did not reach a lateral distance of 5 ft from the vertical centerline of the window opening any time during the test.

Flame Propagation, Core Components

The temperatures in the air cavity behind the panels as measured by TCs 28 and 31-40 did not exceed 1000° F. at any time during the test.

Flame Propagation, Beyond First-Story Test Room (1). Flames did not occur over the surface of the exterior face beyond the concrete block walls or beyond the intersection of the test wall assembly and the concrete block fixture walls. (2). Lateral temperatures of the air cavity, as measured by TCs 18 and 19, did not exceed 1000° F. at any time during the test.

Temperatures in Second-Story Test Room

Temperatures 1 in. from the interior surface of the wall assembly within the second floor test room, as measured by TCs 49-54, did not exceed 500° F. above the ambient temperature at any time during the test.

Flames in Second-Story Test Room

Review of the pertinent TC data, second-floor videotape, and post-test inspection indicated that flame propagation did not occur in the second floor at any time during the test. The panels met acceptance criteria as stated in the NFPA 285 Standard.

FIGS. 25-35 illustrate the temperature data per time for NFPA 285 Test 2.

Example embodiments have been described hereinabove regarding moldable fire resistant composite and processes for manufacturing moldable fire resistant composite. Various modifications to and departures from the disclosed example embodiments will occur to those having ordinary skill in the art. The subject matter that is intended to be within the spirit of this disclosure is set forth in the following claims.

What is claimed is:

1. A fire resistant composite panel that meets the ASTM E84-10 standard and the NFPA 285 standard, comprising two layers:
a first composite layer, comprising a first intumescent resin and a heat-dissipating component; wherein the first composite layer is at least ⅛ inches thick and
a second composite layer comprising a halogenated resin and at least one reinforcing material selected from the group consulting of: glass, crushed glass, glass fiber, carbon fiber, aramid, basalt, hemp, flax, switch grass, cloth, oriented strand cloth, chopped strand mat, paper, ceramic, metal, pearlite, cement, and polymer.

2. The fire resistant composite panel recited in claim 1, wherein the first intumescent resin is a non-halogenated, unsaturated polyester resin.

3. The fire resistant composite panel recited in claim 1, wherein the reinforcing structure is glass fiber.

4. The fire resistant composite panel recited in claim 1, wherein the heat-dissipating component is sand.

5. The fire resistant composite panel recited in claim 1, further comprising: a core layer incorporated with or adhered to the first composite layer to insulate or increase the stiffness of the first composite layer.

6. The fire resistant composite panel recited in claim 1, wherein the heat-dissipating component forms part of an exposed surface of the first composite layer.

7. The fire resistant composite panel recited in claim 1 wherein second composite layer comprises alumina trihydrate.

8. The fire resistant composite panel recited in claim 1, further comprising a core layer incorporated with or adhered to the second composite layer to insulate or increase the stiffness of the second composite layer.

9. A fire resistant composite panel that meets the ASTM E84-10 standard and the NFPA 285 standard, comprising;
a first composite layer, comprising a first intumescent resin and at least one filler from the group consisting of sand, dried silica, anhydrous silicon dioxide ($SiO_2$), gravel, rock, clay, ceramic, and porous cement; wherein the first composite layer is at least 3/16 inches thick;
a second composite layer comprising a halogenated resin and a reinforcing material; and an organic adhesive layer, comprising a second intumescent resin, bonding the first composite to the second composite layer.

10. The fire resistant composite panel recited in claim 9 wherein the second intumescent resin is a non-halogenated, unsaturated polyester resin.

11. The fire resistant composite panel recited in claim 9, wherein the first intumescent resin is a non-halogenated, unsaturated polyester resin.

12. The fire resistant composite panel recited in claim 9, wherein the reinforcing structure is selected from the group consisting of: glass, crushed glass, glass fiber, carbon fiber, aramid, basalt, hemp, flax, switch grass, cloth, oriented strand cloth, chopped strand mat, paper, ceramic, metal, pearlite, cement, and polymer.

13. The fire resistant composite panel recited in claim 9, wherein the reinforcing structure is glass fiber.

14. The fire resistant composite panel recited in claim 9, further comprising: a core layer incorporated with or adhered to the first composite layer to insulate or increase the stiffness of the first composite layer.

15. The fire resistant composite panel recited in claim 9, wherein the filler forms part of an exposed surface of the first composite layer.

16. The fire resistant composite panel recited in claim 9, further comprising a core layer incorporated with or adhered to the second composite layer to insulate or increase the stiffness of the second composite layer.

17. The fire resistant composite panel recited in claim 9, wherein the first composite layer has at least one selected from the group of a surface finish, coloring, or shaping.

18. The fire resistant composite panel recited in claim 9, wherein the second composite layer is at least ¼ inches thick.

19. A fire resistant composite panel that meets the ASTM E84-10 standard and the NFPA 285 standard, comprising:
   a first composite layer, comprising a first intumescent resin and a heat-dissipating component, wherein the heat dissipating component is sand in an amount of at least 100% by weight, based on the weight of the first intumescent resin; and
   a second composite layer adhered to the first composite layer, comprising a halogenated resin and a reinforcing structure, wherein the reinforcing structure comprises glass fibers in an amount of at least 41% by weight, based on the weight of the halogenated resin, and an engineered filler in an amount of 100% by weight of the weight of the halogenated resin.

20. The first resistant composite panel of claim 19, wherein the first composite layer is 3/16 inches thick and the second composite layer is ¼ inches thick.

* * * * *